US012322332B2

(12) United States Patent
Kawachi

(10) Patent No.: US 12,322,332 B2
(45) Date of Patent: Jun. 3, 2025

(54) PIXEL CIRCUIT CONFIGURED TO CONTROL LIGHT-EMITTING ELEMENT

(71) Applicant: Wuhan Tianma Micro-Electronics Co., Ltd., Wuhan (CN)

(72) Inventor: Genshiro Kawachi, Kanagawa (JP)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 17/833,112

(22) Filed: Jun. 6, 2022

(65) Prior Publication Data

US 2022/0398980 A1 Dec. 15, 2022

(30) Foreign Application Priority Data

Jun. 10, 2021 (JP) ................................ 2021-096984
Feb. 17, 2022 (JP) ................................ 2022-023111

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01);
(Continued)

(58) Field of Classification Search
CPC ......... G09G 3/3233; G09G 2300/0426; G09G 2300/0842; G09G 2300/0861;
(Continued)

(56) References Cited

U.S. PATENT DOCUMENTS

2009/0027376 A1* 1/2009 Kwon .................. G09G 3/3233 345/83
2010/0271314 A1* 10/2010 Rofougaran ........ G06F 3/03545 345/173
(Continued)

FOREIGN PATENT DOCUMENTS

CN 110895915 A 3/2020
JP 2009-258227 A 11/2009

OTHER PUBLICATIONS

Chinese Office Action issued Mar. 7, 2024 in Application No. 202210617746.1.

*Primary Examiner* — Jeff Piziali
(74) *Attorney, Agent, or Firm* — Sughrue Mion, PLLC

(57) ABSTRACT

A pixel circuit includes a first switching transistor between a gate and a drain of a driving transistor, a second switching transistor, and an auxiliary capacitor connected to the second switching transistor. The second switching transistor transfers a data signal voltage from a data line to a storage capacitor through the driving transistor and the first switching transistor. The auxiliary capacitor retains the auxiliary charges depending on the data signal voltage from the data line during a first period where the second and first switching transistors are ON. The auxiliary charges are transfer from the auxiliary capacitor to the storage capacitor through the first switching transistor and the driving transistor during the second period where the second switching transistor is OFF and the first switching transistor is ON. Capacitance of the auxiliary capacitor is equal to or larger than ½ of capacitance of the storage capacitor.

9 Claims, 21 Drawing Sheets

(52) U.S. Cl.
CPC . *G09G 2300/0861* (2013.01); *G09G 2310/08* (2013.01); *G09G 2320/0257* (2013.01)

(58) Field of Classification Search
CPC ....... G09G 2310/08; G09G 2320/0257; G09G 3/3258; G09G 3/3266
See application file for complete search history.

(56) References Cited

U.S. PATENT DOCUMENTS

| | | | | |
|---|---|---|---|---|
| 2012/0019505 | A1* | 1/2012 | Hwang | G09G 3/3233 345/82 |
| 2012/0268194 | A1* | 10/2012 | Koyama | H01L 27/1296 327/427 |
| 2014/0292827 | A1* | 10/2014 | Kang | G09G 3/3241 345/76 |
| 2016/0133191 | A1* | 5/2016 | Kang | G09G 3/3258 345/212 |
| 2021/0065624 | A1 | 3/2021 | Li et al. | |
| 2021/0167161 | A1* | 6/2021 | Yang | G09G 3/3275 |
| 2021/0335247 | A1* | 10/2021 | Chen | G09G 3/3241 |
| 2021/0390902 | A1* | 12/2021 | Lee | G09G 3/2007 |
| 2022/0077244 | A1* | 3/2022 | Wang | H01L 27/1296 327/427 |
| 2022/0415991 | A1* | 12/2022 | Kwon | H01L 27/1296 327/427 |

* cited by examiner

PIXEL CIRCUIT CONFIGURED TO CONTROL LIGHT-EMITTING ELEMENT

CROSS-REFERENCE TO RELATED APPLICATIONS

This non-provisional application claims priority under 35 U.S.C. § 119(a) on Patent Application No. 2021-096984 filed in Japan on Jun. 10, 2021 and Patent Application No. 2022-023111 filed in Japan on Feb. 17, 2022, the entire contents of which are hereby incorporated by reference.

BACKGROUND

This disclosure relates to a pixel circuit configured to control a light-emitting element.

An organic light-emitting diode (OLED) element is a current-driven self-light-emitting element and therefore, does not need a backlight. In addition to this, the OLED element has advantages for achievement of low power consumption, wide viewing angle, and high contrast ratio; it is expected to contribute to development of flat panel display devices.

An active-matrix (AM) OLED display device includes transistors for selecting pixels and driving transistors for supplying electric current to the pixels. The transistors in an OLED display device are thin-film transistors (TFTs); commonly, low-temperature polysilicon (LTPS) TFTs are used.

The TFTs have variations in their threshold voltage and charge mobility. Since the driving transistors determine the light emission intensity of the OLED display device, their variations in electrical characteristics could cause a problem. Hence, a typical OLED display device includes an adjustment circuit for compensating for the variations and shifts of the threshold voltage of the driving transistors.

An OLED display device could show a ghost image and this phenomenon is called image retention. For example, in displaying a full-screen image of an intermediate emission level after displaying a black and white checkerboard pattern for a specific period, the OLED display device displays a ghost image of the checkerboard pattern of different emission levels for a while.

This is caused by hysteresis effect of the driving transistors. The hysteresis effect causes a phenomenon such that the drain current in a field-effect transistor flows differently between the case where the gate-source voltage changes from a high voltage to a low voltage and the case where the gate-source voltage changes from the low voltage to the high voltage.

That is to say, the drain current flows differently between the pixels whose emission level is changed from the black level to an intermediate level and the pixels whose emission level is changed from the white level to the intermediate level. For this reason, the OLED display device emits different intensities of light. This difference in drain current lasts over several frames and therefore, the difference in intensity of emitted light is perceived as a ghost. This behavior of the drain current is referred to as transient response of the current by hysteresis effect.

SUMMARY

An aspect of this disclosure is a pixel circuit configured to control light emission of a light-emitting element, the pixel circuit including: a light-emitting element; a driving transistor configured to control driving current to the light-emitting element; a storage capacitor connected to a gate of the driving transistor and being configured to store control voltage for the driving transistor; a first switching transistor configured to connect or disconnect between the gate and a drain of the driving transistor, a second switching transistor connected between a data line and a source of the driving transistor, the second switching transistor being configured to transfer a data signal voltage from the data line to the storage capacitor through the driving transistor and the first switching transistor; and an auxiliary capacitor connected to the second switching transistor, the auxiliary capacitor being configured to store auxiliary charges that depend on the data signal voltage from the data line. The auxiliary capacitor retains auxiliary charges in accordance with the data signal voltage from the data line during a first period where the second switching transistor and the first switching transistor are both ON. The auxiliary charges are transfer from the auxiliary capacitor to the storage capacitor through the first switching transistor and the driving transistor during the second period where the second switching transistor is OFF and the first switching transistor is ON. Capacitance of the auxiliary capacitor is equal to or larger than ½ of capacitance of the storage capacitor.

Another aspect of this disclosure is a pixel circuit configured to control light emission of a light-emitting element, the pixel circuit including: a light-emitting element; a driving transistor configured to control driving current to the light-emitting element; a storage capacitor connected to a gate of the driving transistor and being configured to store control voltage for the driving transistor; a first switching transistor configured to connect or disconnect between the gate and a drain of the driving transistor; a second switching transistor connected between a data line and a source of the driving transistor, the second switching transistor being configured to transfer a data signal voltage from the data line to the storage capacitor through the driving transistor and the first switching transistor; and a first auxiliary capacitor and a second auxiliary capacitor connected to the second switching transistor, the first auxiliary capacitor and the second auxiliary capacitor being configured to store auxiliary charges depending on the data signal voltage from the data line. The first auxiliary capacitor is connected between a power supply line provided to supply an anode current for the light-emitting element and a node between the second switching transistor and the driving transistor. The second auxiliary capacitor is connected between the node between the second switching transistor and the driving transistor and an anode electrode of the light-emitting element.

It is to be understood that both the foregoing general description and the following detailed description are exemplary and explanatory and are not restrictive of this disclosure.

EMBODIMENTS

Figure 1:
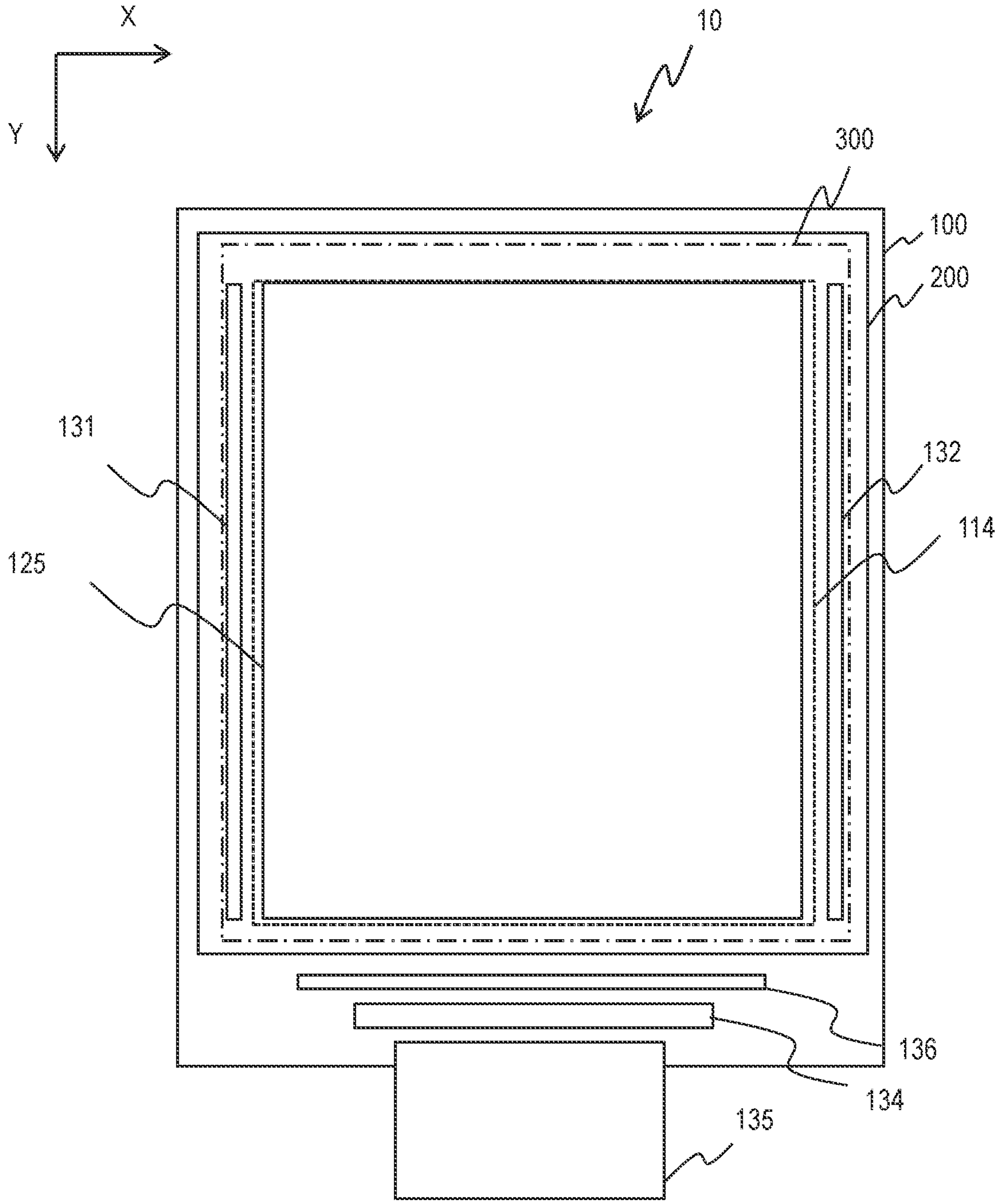
FIG. 1 schematically illustrates a configuration example of an OLED display device of a display device.

Hereinafter, embodiments of this disclosure will be specifically described with reference to the accompanying drawings. Elements common to the drawings are denoted by the same reference signs and each element in the drawings may be exaggerated in size and/or shape for clear understanding of the description.

Disclosed in the following are techniques to improve the driving current control in an electro-luminescent display device, more specifically, techniques to diminish image retention in an electro-luminescent display device. The electro-luminescent display device is a display device utilizing light-emitting elements that emit light in response to driving current, like an organic light-emitting diode (OLED) display device.

Configuration of Display Device

FIG. 1 schematically illustrates a configuration example of an OLED display device 10 of a display device. The horizontal direction in FIG. 1 is an X-axis direction and the vertical direction is a Y-axis direction, which is perpendicular to the X-axis direction. The OLED display device 10 includes a thin film transistor (TFT) substrate 100 on which OLED elements (organic light-emitting elements) are formed, an encapsulation substrate 200 for encapsulating the OLED elements, and a bonding member 300 for bonding the TFT substrate 100 with the encapsulation substrate 200.

The space between the TFT substrate 100 and the encapsulation substrate 200 is filled with an inactive gas such as dry nitrogen and sealed up with the bonding member 300. In place of the encapsulation substrate 200, a structural encapsulation unit having a different structure, such as a structural encapsulation unit utilizing thin-film encapsulation, can be employed.

In the periphery of a cathode electrode region 114 outer than the display region 125 of the TFT substrate 100, scanning circuits 131 and 132, a driver IC 134, and a demultiplexer 136 are provided. The driver IC 134 is connected to the external devices via flexible printed circuits (FPC) 135. The scanning circuits 131 and 132 drive scanning lines on the TFT substrate 100.

The driver IC 134 is mounted with an anisotropic conductive film (ACF), for example. The driver IC 134 provides power and timing signals (control signals) to the scanning circuits 131 and 132 and further, provides a data signal to the demultiplexer 136.

The demultiplexer 136 outputs output of one pin of the driver IC 134 to d data lines in series (d is an integer greater than 1). The demultiplexer 136 changes the output data line for the data signal from the driver IC 134 d times per scanning period to drive d times as many data lines as output pins of the driver IC 134.

The display region 125 includes a plurality of OLED elements (pixels) and a plurality of pixel circuits for controlling light emission of the plurality of pixels. In an example of a color OLED display device, each OLED element emits light in one of the colors of red, blue, and green. The plurality of pixel circuits constitute a pixel circuit array.

As will be described later, each pixel circuit includes a driving TFT (driving transistor) and a storage capacitor for storing signal voltage to determine the driving current of the driving TFT. The data signal transmitted by a data line is adjusted for the threshold voltage Vth of the driving TFT and stored to the storage capacitor. The voltage of the storage capacitor determines the gate voltage (Vgs) of the driving TFT. The adjusted control voltage in the storage capacitor changes the conductance of the driving TFT in an analog manner to supply a forward bias current corresponding to the light emission level to the OLED element.

The pixel circuit in an embodiment of this specification further includes an auxiliary capacitor for storing auxiliary voltage for adjusting the voltage stored in the storage capacitor. After a data signal is written from the data line to the pixel circuit, the auxiliary capacitor supplies a potential to the storage capacitor to adjust the voltage stored in the storage capacitor. The auxiliary capacitor provides more appropriate adjustment for the threshold voltage Vth of the driving TFT to the control voltage stored in the storage capacitor.

Pixel Circuit

Figure 2:
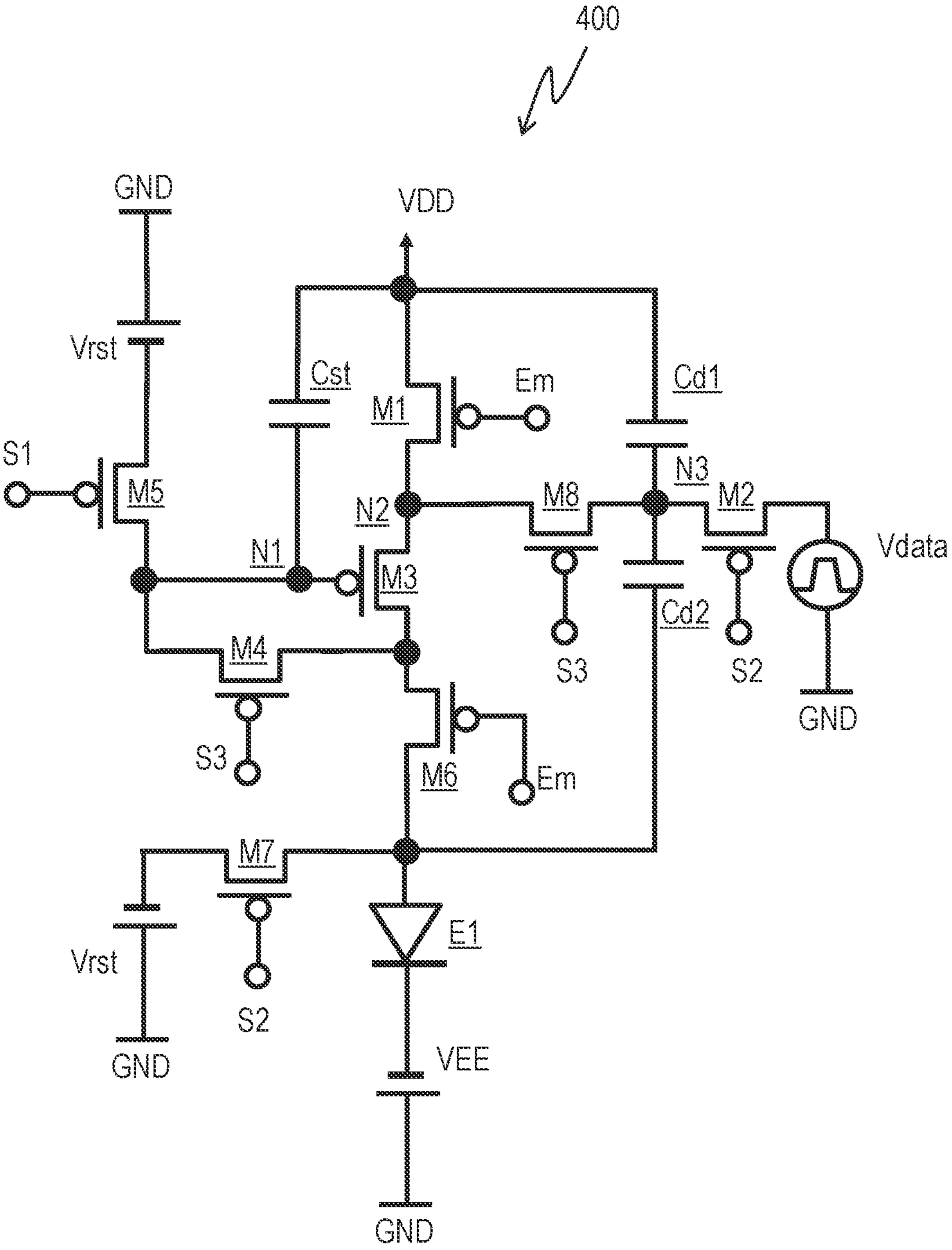
FIG. 2 illustrates a configuration example of a pixel circuit in an embodiment of this specification.

FIG. 2 illustrates a configuration example 400 of a pixel circuit in an embodiment of this specification. The pixel circuit 400 includes a storage capacitor for storing control voltage for controlling the amount of electric current of the driving transistor. The control voltage stored in the storage capacitor is also referred to as driving voltage of the driving transistor. The storage capacitor stores a control voltage in accordance with a data signal (the potential thereof) sent from the driver IC 134 through a data line. The control voltage is a voltage after adjustment for the threshold voltage Vth of the driving transistor (Vth compensation) is applied to the data signal and can be referred to as adjusted data voltage.

The pixel circuit 400 further includes auxiliary capacitors Cd1 and Cd2, for storing auxiliary charges that depends on the data signal supplied from the data line. The auxiliary voltage takes a value depending on the data signal and can be referred to as data voltage. The auxiliary capacitors are located between the data line and the driving transistor in the pixel circuit. Each auxiliary capacitor supplies charges in accordance with the auxiliary voltage to the storage capacitor through the diode-connected driving transistor. Hence, the Vth compensation is kept being applied to the control voltage retained in the storage capacitor.

The pixel circuit 400 adjusts the data signal supplied from the driver IC 134 and controls light emission of an OLED element with the adjusted signal. The pixel circuit 400 includes eight transistors (TFTs) M1 to M8 each having a gate, a source, and a drain. The transistors M1 to M8 in this example are p-type TFTs and the transistors except for the driving transistor M3 are switching transistors. The transistor M8 is optional.

The pixel circuit 400 further includes a storage capacitor Cst, a first auxiliary capacitor Cd1, and a second auxiliary capacitor Cd2. The storage capacitor Cst is connected between an anode power supply for supplying a power-supply potential VDD and the gate of the driving transistor M3 (a node N1). The storage capacitor Cst stores the gate-source voltage (also referred to as gate voltage or control voltage) of the driving transistor M3.

One end of the auxiliary capacitor Cd1 is connected to a node N3 located between a source/drain of the switching transistor M2 and a source/drain of the driving transistor M3 and the other end is connected to a power line for transmitting the anode power-supply potential VDD. The auxiliary capacitor Cd1 stores an auxiliary voltage between the source/drain of the switching transistor M2 and the anode power supply. The transistor M2 is a second switching transistor for switching between transmission and stop of the transmission of a data signal to the storage capacitor.

One end of the auxiliary capacitor Cd2 is connected to the node N3 located between a source/drain of the switching transistor M2 and a source/drain of the driving transistor M3 and the other end is connected to the anode electrode of the OLED element E1. The auxiliary capacitor Cd2 stores an auxiliary voltage between the source/drain of the switching transistor M2 and the anode electrode of the OLED element E1.

The transistor M3 is a driving transistor for controlling the amount of electric current to the OLED element E1. The driving transistor M3 controls the amount of electric current to be supplied from the anode power supply to the OLED element E1 in accordance with the voltage stored in the storage capacitor Cst. The cathode of the OLED element E1 is connected to a cathode power supply for supplying a cathode potential VEE.

The transistors M1 and M6 control whether the OLED element E1 should emit light or not. The transistor M1 is connected to the anode power supply from a source/drain and switches ON/OFF the supply of electric current to the driving transistor M3 connected from the other source/drain. The transistor M6 is connected to the drain of the driving transistor M3 from a source/drain and switches ON/OFF the supply of electric current to the OLED element E1 connected from the other source/drain. The transistors M1 and M6 are controlled by an emission control signal Em input from the scanning circuit 131 or 132 to their gates.

The transistor M7 works to supply a reset potential to the anode of the OLED element E1. When the transistor M7 is turned on by a selection signal S2 input from the scanning circuit 131 or 132 to the gate, it supplies a reset potential Vrst from a reset power supply to the anode of the OLED element E1. The reset potential can be the GND potential or a potential lower than that. The other end of the reset power supply is connected to the GND.

The transistor M5 controls whether to supply a reset potential to the gate of the driving transistor M3. When the transistor M5 is turned on by a selection signal S1 input from the scanning circuit 131 or 132 to the gate terminal, it supplies the reset potential Vrst from the reset power supply that is connected to a source/drain of the transistor M5 to the gate of the driving transistor M3. The other end of the reset power supply is connected to the GND. The reset potential for the anode electrode of the OLED element E1 can be different from the reset potential for the gate of the driving transistor M3.

The transistor M2 is a selection transistor for selecting the pixel circuit 400 to be supplied with a data signal. The gate voltage of the transistor M2 is controlled by the selection signal S2 supplied from the scanning circuit 131 or 132. When the selection transistor M2 is ON, it supplies a data signal Vdata supplied from the driver IC 134 through the data line to the auxiliary capacitors Cd1 and Cd2.

In this example, the source and the drain of the transistor M2 are connected between the data line and the source of the driving transistor M3 (node N2). Further, the transistor M8 is connected between a source/drain of the selection transistor M2 (node N3) and the source of the driving transistor M3 (node N2). The transistor M8 is a third switching transistor. The transistor M4 is connected between the drain and the gate of the driving transistor M3. The transistor M4 is a first switching transistor.

The transistors M4 and M8 are controlled by a selection signal S3 supplied from the scanning circuit 131 or 132. The transistor M4 works to compensate the threshold voltage Vth of the driving transistor M3. The transistor M4 switches between connection and disconnection of the gate and the drain of the driving transistor M3. When the transistor M4 is ON, the driving transistor M3 is in a diode connection state. When the transistor M4 is OFF, the driving transistor M3 is in a normal state.

The data signal Vdata from the data line is supplied to the storage capacitor Cst through the transistors M2 and M8 in an ON state, the driving transistor M3 in a diode connection state, and the transistor M4 in an ON state. Simultaneously, Vth compensation is applied. In this period, the data signal Vdata from the data line is also supplied to the auxiliary capacitors Cd1 and Cd2 through the transistor M2 in an ON state.

After the transistor M2 is turned OFF, the charges stored at the node N3 by the auxiliary voltages of the auxiliary capacitors Cd1 and Cd2 is transferred to the storage capacitor Cst through the transistor M8 in an ON state, the driving transistor M3 in a diode-connection state, and the transistor M4 in an ON state. This charge transfer process further proceeds the Vth compensation to the control voltage stored in the storage capacitor Cst.

The storage capacitor Cst stores the gate-source voltage of the driving transistor M3 to control the amount of electric current to be supplied from the driving transistor M3 to the OLED element E1. As described above, the storage capacitor Cst stores a voltage adjusted depending on the threshold voltage Vth of the driving transistor M3.

As described above, the Vth compensation to the control voltage of the storage capacitor Cst can be continued with the auxiliary capacitors Cd1 and Cd2 after the transistor M2 is turned OFF. Hence, more appropriate Vth compensation can be performed, which effectively reduces image retention.

The pixel circuit 400 in the example of FIG. 2 includes two auxiliary capacitors Cd1 and Cd2. This configuration increases the capacitance for storing the auxiliary charges in the pixel circuit 400 to perform more effective Vth compensation. If another configuration example that can secure a required capacitance is available, one of the two auxiliary capacitors Cd1 and Cd2 can be excluded. In writing an auxiliary voltage to the auxiliary capacitor, one end of the capacitor is supplied with a data signal and the other end is supplied with a predetermined fixed potential. The fixed potential is not limited to a specific one.

Figure 3:
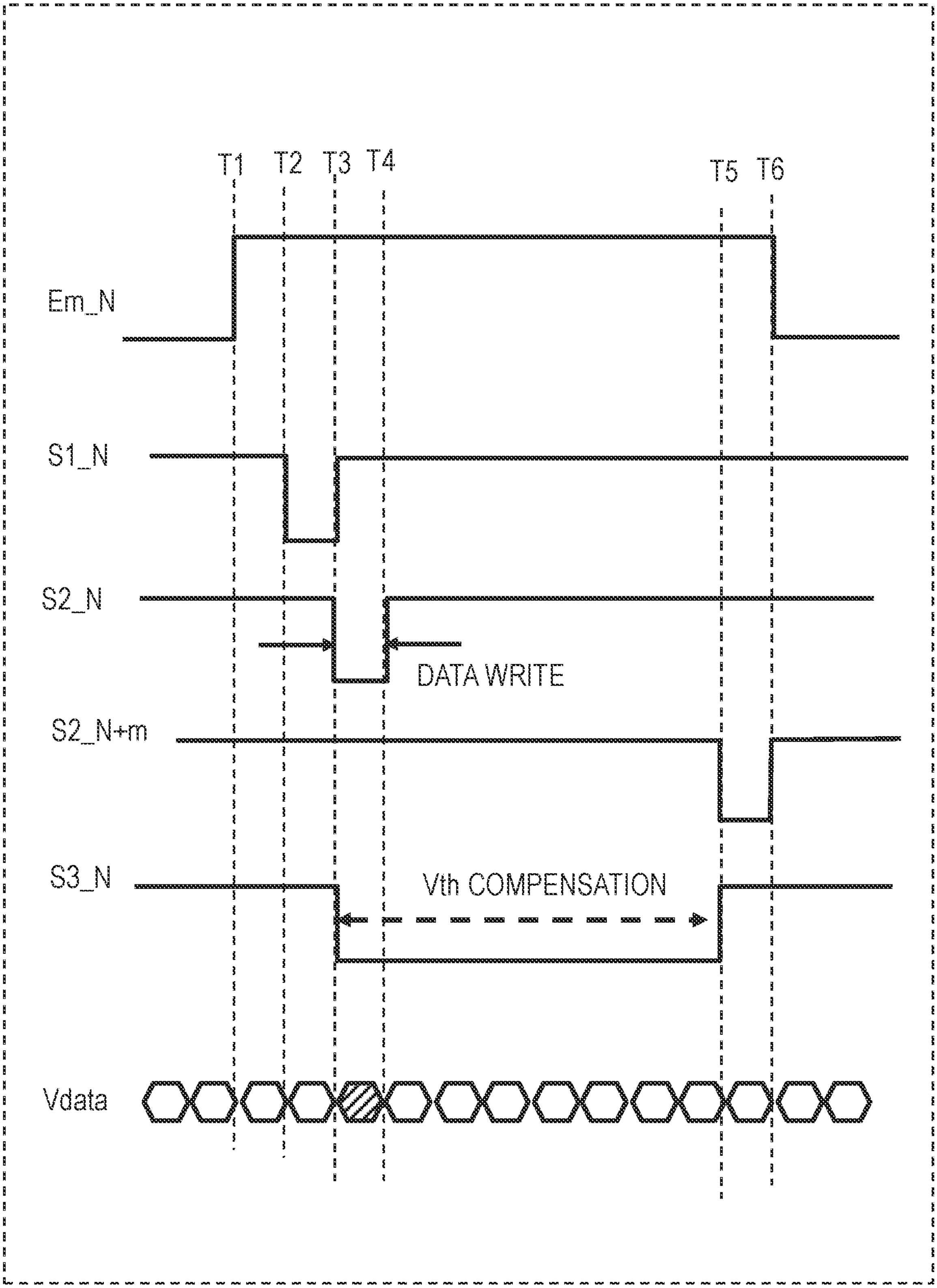
FIG. 3 is a timing chart of the signals for controlling the pixel circuit illustrated in FIG. 2 in one frame period.

FIG. 3 is a timing chart of the signals for controlling the pixel circuit 400 illustrated in FIG. 2 in one frame period. FIG. 3 is a timing chart for selecting the N-th pixel circuit row and writing a data signal Vdata to the pixel circuit 400. Specifically, the signals illustrated in FIG. 3 are the emission control signal Em, the selection signal S1, the selection signal S2, the selection signal S3, and the data signal Vdata. The selection signal S2 can be in common with the selection signal S1_N+1 for the (N+1)th row.

At a time T1, the emission control signal Em changes from Low to High. The transistors M1 and M6 turn OFF at the time T1. The selection signals S1, S2, and S3 are High at the time T1. In accordance with these control signals, the transistors M2, M4, M5, M7, and M8 are OFF. The states of these transistors are maintained until a time T2 later than the time T1. The potential at the node N1 is the signal potential of the previous frame.

At the time T2, the selection signal S1 changes from High to Low. The emission control signal Em and the selection signals S2 and S3 are High at the time T2. The transistor M5 turns ON in response to the change of the selection signal S1. The transistors M1, M2, M4, and M6 to M8 are OFF.

In response to the transistor M5 turning ON, the potential at the node N1 changes to the reset potential Vrst. The reset potential Vrst is supplied to the node N1 from the time T2 until a time T3. Since the node N1 supplied with the reset potential every frame makes the gate potential of the driving transistor M3 the same potential every frame, the hysteresis effect of the driving transistor M3 can be reduced.

At the time T3, the selection signal S1 changes from Low to High and the selection signals S2 and S3 change from High to Low. The emission control signal Em is High. The transistor M5 turns OFF in response to the change of the selection signal S1. The transistors M2 and M7 turn ON in response to the change of the selection signal S2. The transistors M4 and M8 turn ON in response to the change of the selection signal S3. The transistors M1 and M6 remain OFF.

In response to the transistor M7 turning ON, the reset potential Vrst is supplied to the anode of the OLED element E1 and one end of the auxiliary capacitor Cd2. Since the transistor M4 is ON, the driving transistor M3 is diode-connected.

Since the transistors M2 and M8 are ON, the data signal Vdata from the data line is written to the storage capacitor Cst through the transistors M2, M8, M3, and M4. The voltage to be written to the storage capacitor Cst is a voltage after the adjustment for the threshold voltage Vth of the driving transistor M3 is applied to the data signal Vdata.

Moreover, since the transistor M2 is ON, the data signal Vdata from the data line is written to the auxiliary capacitors Cd1 and Cd2 through the transistor M2. The auxiliary capacitor Cd1 stores the voltage between the anode power supply potential (fixed potential) and the data signal and the auxiliary capacitor Cd2 stores the voltage between the data signal and the reset power supply potential (fixed potential). During the period from the time T3 to a time T4, writing the data signal Vdata to the pixel circuit 400 and Vth compensation to the data signal Vdata are performed.

At the time T4, the selection signal S2 changes from Low to High. The emission control signal Em and the selection signal S1 are High and the selection signal S3 is Low at the time T4. The transistors M2 and M7 turn OFF in response to the change of the selection signal S2. The transistors M8 and M4 are ON and the transistors M1, M2, and M5 to M7 are OFF.

Since the transistors M8 and M4 are ON, the Vth compensation to the control signal stored in the storage capacitor Cst is continued with the auxiliary voltages (data voltages) stored in the auxiliary capacitors Cd1 and Cd2. These states of the control signals and the transistors are maintained from the time T4 to a time T5. In an example, the auxiliary capacitors Cd1 and Cd2 have capacitances necessary to keep the node N3 at substantially the same potential as the potential of the data signal Vdata for this period.

At the time T5, the selection signal S3 changes from Low to High. The time T5 coincides with the time at which the selection signal S2 for the (N+m)th row (m is an integer greater than 1) changes from High to Low. In response to this change of the selection signal S3, the transistors M4 and M8 turn OFF. The other switching transistors remain OFF. The Vth compensation to the control voltage in the storage capacitor Cst with the auxiliary capacitors Cd1 and Cd2 ends at the time T5.

At a time T6, the emission control signal Em changes from High to Low and the transistors M1 and M6 turn from OFF to ON. The selection signals S1, S2, and S3 are High and the transistors M2, M4, M5, M7, and M8 remain OFF. The driving transistor M3 controls the driving current to be supplied to the OLED element E1 based on the adjusted data voltage stored in the storage capacitor Cst. This means that the OLED element E1 emits light.

The above-described pixel circuit operation enables Vth compensation to be applied for the period from the time T3 to the time T5. This period is longer than the period from the time T3 to the time T4, where the selection signal S2 is Low and the data signal is written from the data line to the pixel circuit. A Vth compensation period appropriate for a display device can be determined by adjusting the time T5 in designing the circuit. The determined Vth compensation period is longer than a data write period.

The data write period in the example of FIG. 3 is the period from the time T3 to the time T4. The Vth compensation period is the period from the time T3 to the time T5. The data write period is a period where the transistor M2 is ON and the data signal is supplied from the data line to the pixel circuit. The Vth compensation period is a period where a potential is supplied to the storage capacitor Cst through the driving transistor M3 in a diode connection state and Vth compensation is applied to the control voltage in the storage capacitor Cst.

The data write period in the example of FIG. 3 is included in the Vth compensation period. That is to say, data write and Vth compensation are performed together during the period from the time T3 to the time T4. In the subsequent period from the time T4 to the time T5, however, data write is not performed and only Vth compensation with the auxiliary capacitors is performed. This configuration of the Vth compensation period including the data write period enables more appropriate Vth compensation.

In another configuration example, the data write period can end before the Vth compensation period without an overlap period. For example, the data write period can be the period from the time T2 to the time T3 in the timing chart of FIG. 3. This period is a reset period where the selection signal S1 is Low and the reset potential is supplied to the gate of the driving transistor M3. Since the transistor M8 is OFF, the data signal from the data line is supplied to the auxiliary capacitors Cd1 and Cd2 without being supplied to the storage capacitor Cst.

Conditions for Auxiliary Capacitor

Hereinafter, examples of the conditions for the auxiliary capacitors Cd1 and Cd2 are described. It is desirable that the potential at the node N2 be maintained at the potential Vdata of the data signal during the Vth compensation period where the selection signal S3 is Low. If the total auxiliary capacitance (Cd1+Cd2) of the auxiliary capacitors is small, the potential at the node N2 drastically drops to stop the Vth compensation mechanism. Accordingly, auxiliary capacitors having a sufficiently large total auxiliary capacitance Cd are included in the pixel circuit to enhance the charge retention function at the node N2. As a result, the node N2 attains smaller potential variation during the Vth compensation period to continue the Vth compensation.

Figure 4:
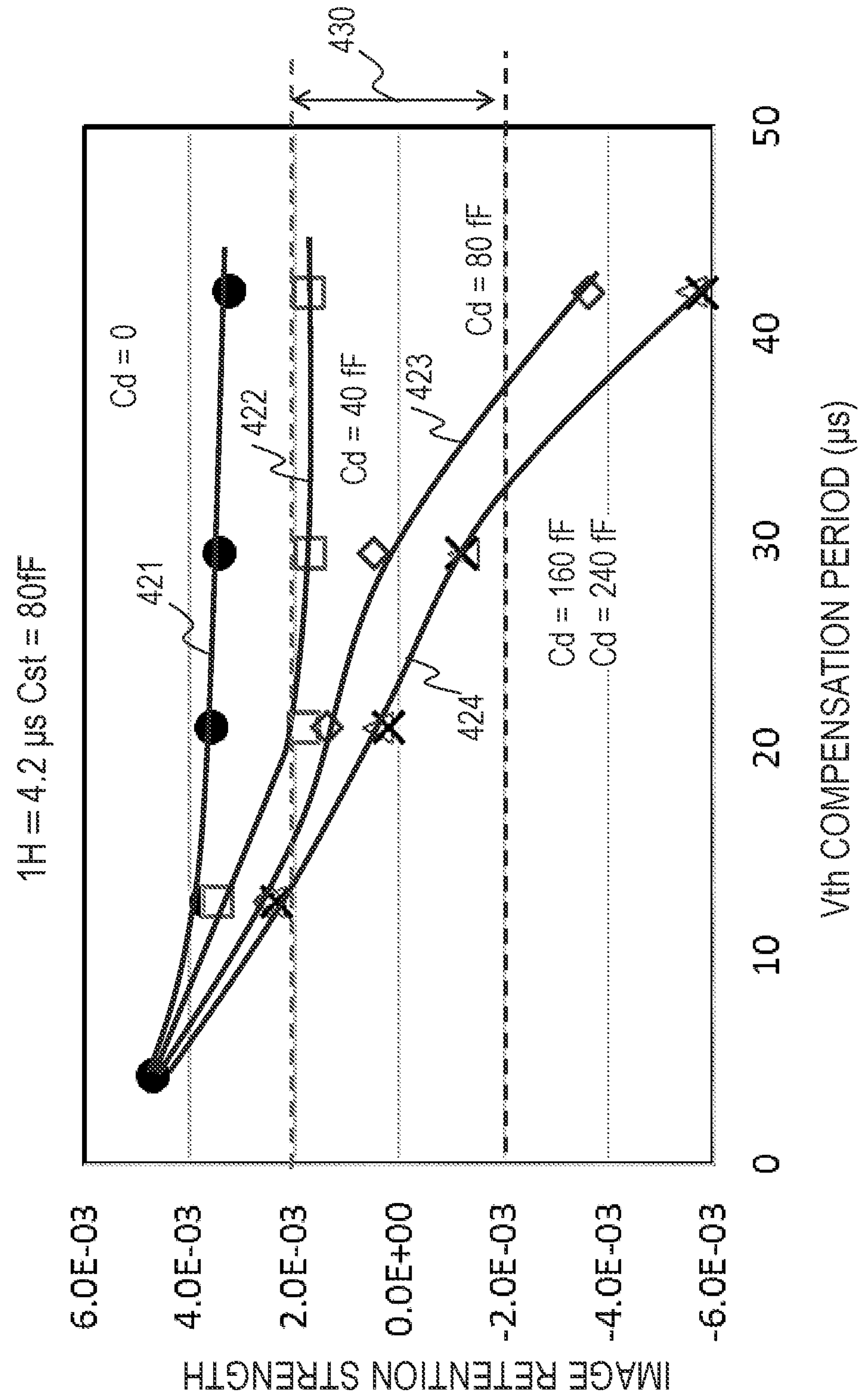
FIG. 4 illustrates simulation results on the relation between Vth compensation period and image retention in the pixel circuit illustrated in FIGS. 2 and 3.

FIG. 4 illustrates simulation results on the relation between Vth compensation period and image retention in the pixel circuit illustrated in FIGS. 2 and 3. In the graph of FIG. 4, the horizontal axis represents the Vth compensation period and the horizontal axis represents the indicator of the strength of image retention. When the indicator takes a positive value, the image retention is of a negative type. When the indicator takes a negative value, the image retention is of a positive type. When the indicator takes a value farther from 0, the image retention is stronger. The data write period (1H period) is 4.2 μs and the capacitance of the storage capacitor Cst is 80 fF. The data write period is also referred to as horizontal selection period.

The different lines in the graph represent simulation results of different total auxiliary capacities Cd of the two auxiliary capacitors Cd1 and Cd2. The line 421 represents the data of a pixel circuit in which the total capacitance of the auxiliary capacitors is 0. The line 422 represents the data of a pixel circuit in which the total capacitance of the auxiliary capacitors is 40 fF. The line 423 represents the data of a pixel circuit in which the total capacitance of the auxiliary capacitors is 80 fF. The line 424 represents the data of a pixel circuit in which the total capacitance of the auxiliary capacitors is 160 fF or 240 fF.

The image retention strength indicator is defined as follows:

$$\text{Image retention strength indicator}=2.0*(I_1-I_2)/(I_1+I_2),$$

where $I_1$ represents the drain current when the emission level is changed from black to an intermediate level and $I_2$ represents the drain current when the emission level is changed from white to the intermediate level after a black and white checkerboard pattern is displayed for a predetermined period.

In view of this definition, when $I_1>I_2$ or the image retention indicator takes a positive value, the current (brightness) of a pixel having displayed black become higher than the current of a pixel having displayed white, so that the ghost is a checkerboard pattern in which the brightness is inverted from the original black and white checkerboard pattern. Accordingly, it is defined as negative image retention. When $I_1<I_2$, the image retention is defined as positive image retention.

The range 430 in FIG. 4 is a range where the image retention strength indicator takes a value from −2.0E-03 to 2.0E-03. This range 430 is a range of ignorable image retention obtained from the Inventor's experimental results. It is known that the image retention depends on the bias history of the driving TFT and the image retention strength indicator increases in almost proportion to the stress time by displaying a black and white checkerboard pattern.

It is generally known that a ghost can be visually perceived of when the difference in brightness between adjacent regions is approximately ±1%. However, the stress time by displaying black and white in these simulations is approximately 1/10 as short as the test condition for actual products and therefore, the image retention strength indicator takes smaller values. The above range 430 is determined in view of the difference between the display condition of the display panel and the simulation condition.

As illustrated in FIG. 4, when the total auxiliary capacitance Cd is 40 fF or more, the image retention strength can be included in the range 430 by determining the Vth compensation period appropriately. Further, when the total auxiliary capacitance Cd is 80 fF or more, the image retention strength can be reduced to zero by determining the Vth compensation period appropriately.

Since the capacitance of the storage capacitor Cst is 80 fF as described above, the image retention strength can be included in the range 430 by providing a total auxiliary capacitance of ½ or more of the capacitance of the storage capacitor. Further, the image retention strength can be reduced to zero by providing a total auxiliary capacitance equal to or more of the capacitance of the storage capacitor.

As illustrated in FIG. 4, when both of the value of Cd and the length of the compensation period are too large, the image retention strength indicator falls too far in the negative direction. To appropriately diminish the image retention, determining an appropriate compensation period is important. In the following, the compensation period is described.

Figure 5:
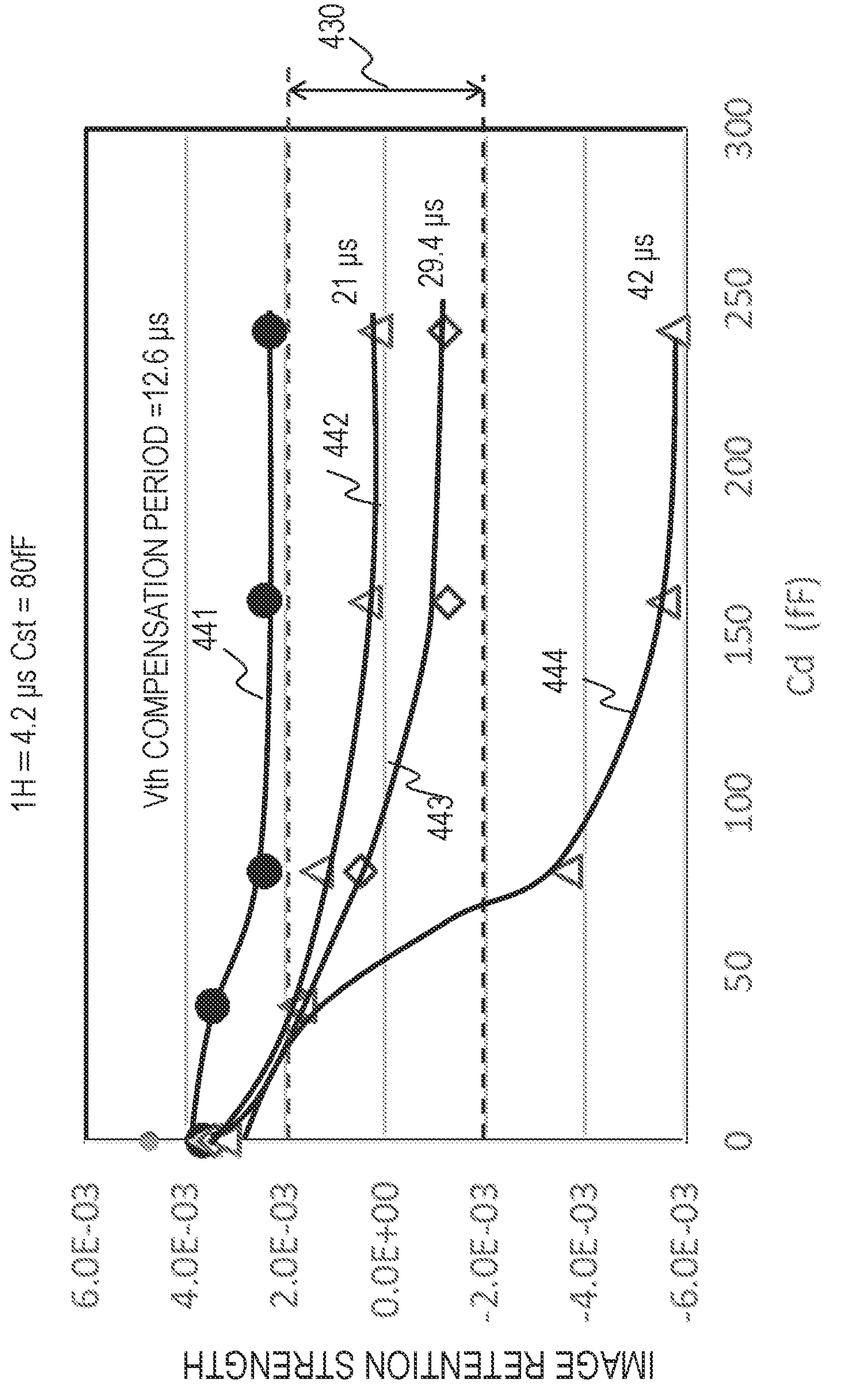
FIG. 5 illustrates simulation results on the relation between total capacitance of auxiliary capacitors and image retention in the pixel circuit illustrated in FIGS. 2 and 3.

FIG. 5 illustrates simulation results on the relation between total auxiliary capacitance and image retention in the pixel circuit illustrated in FIGS. 2 and 3. In the graph of FIG. 5, the horizontal axis represents the total auxiliary capacitance and the horizontal axis represents the image retention strength. A data write period (1H period) is 4.2 μs and the capacitance of the storage capacitor Cst is 80 fF.

Different lines in the graph represent simulation results of different Vth compensation periods. The line 441 represents data on the pixel circuit when the Vth compensation period is 12.6 μs; the line 442 represents data on the pixel circuit when the Vth compensation period is 21.0 μs; the line 443 represents data on the pixel circuit when the Vth compensation period is 29.4 μs; and the line 444 represents data on the pixel circuit when the Vth compensation period is 42.0 μs.

As illustrated in FIG. 5, when the Vth compensation period is between 21.0 μs and 42.0 μs, the image retention strength can be included in the range 430 by determining the total auxiliary capacitance appropriately. Since the data write period (1H period) is 4.2 μs, the image retention strength can be included in the range 430 by determining the Vth compensation period to be not less than 5H and not more than 10H.

Figure 6:
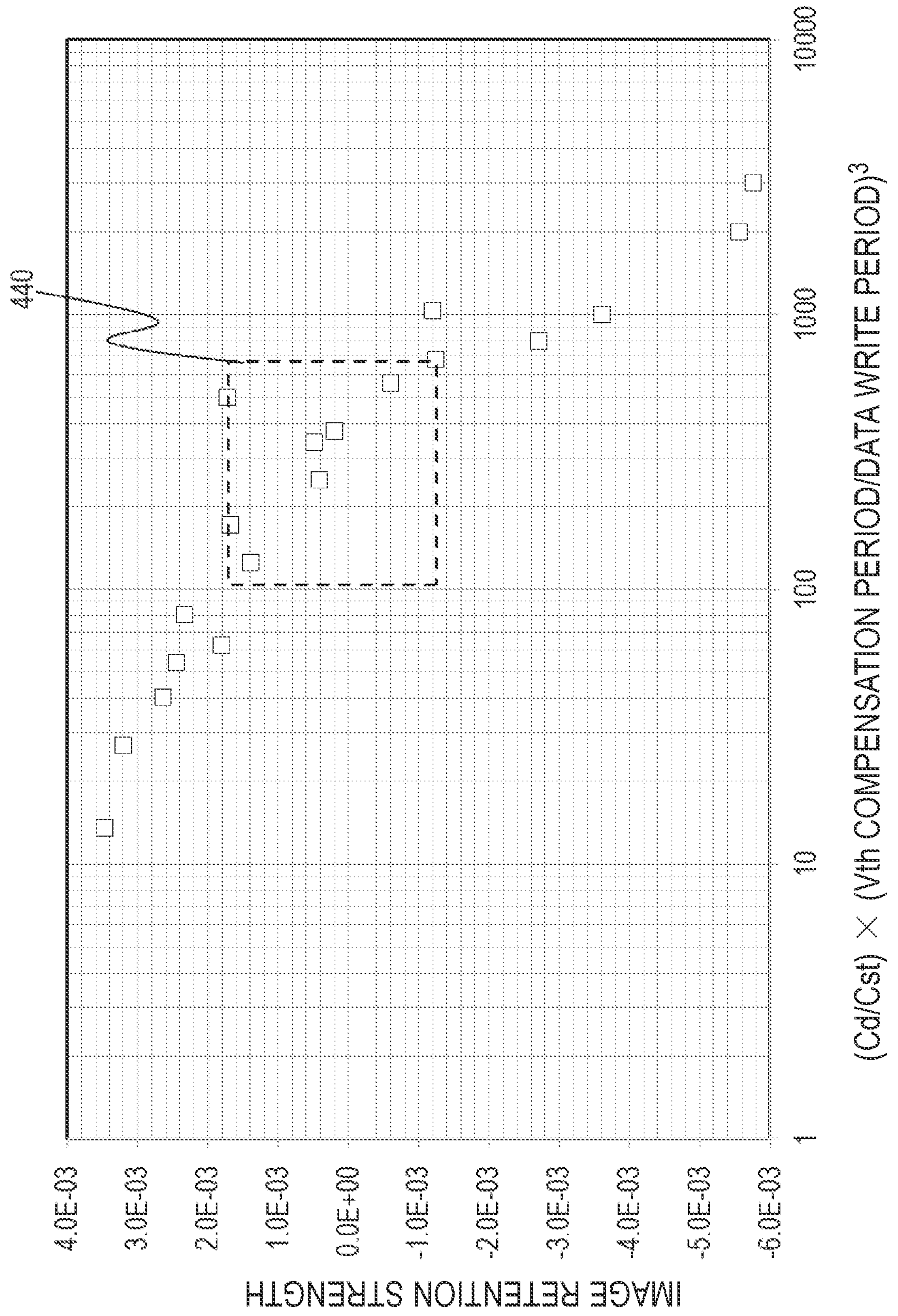
FIG. 6 is a graph illustrating the simulation results on the pixel circuit illustrated in FIGS. 2 and 3 from another point of view.

FIG. 6 is a graph illustrating the simulation results on the pixel circuit illustrated in FIGS. 2 and 3 from another point of view. The horizontal axis represents (Cd/Cst)×(Vth compensation period/data write period)$^3$, where Cd represents the total auxiliary capacitance and Cst represents the capacitance of the storage capacitor. The vertical axis represents image retention strength. Different combinations of a value Cd and a length of the Vth compensation period can be at the same value on the horizontal axis and different values on the vertical axis. The rectangular range 440 in FIG. 6 is a range where the image retention strength indicator ranges from −2.0E-03 to 2.0E-03. As understood from the graph of FIG. 6, the image retention strength can be included in the aforementioned desirable range by satisfying the following condition:

$$100\leq(Cd/Cst)\times(Vth\text{ compensation period/data write period})^3\leq700.$$

Device Structure

Figure 7:
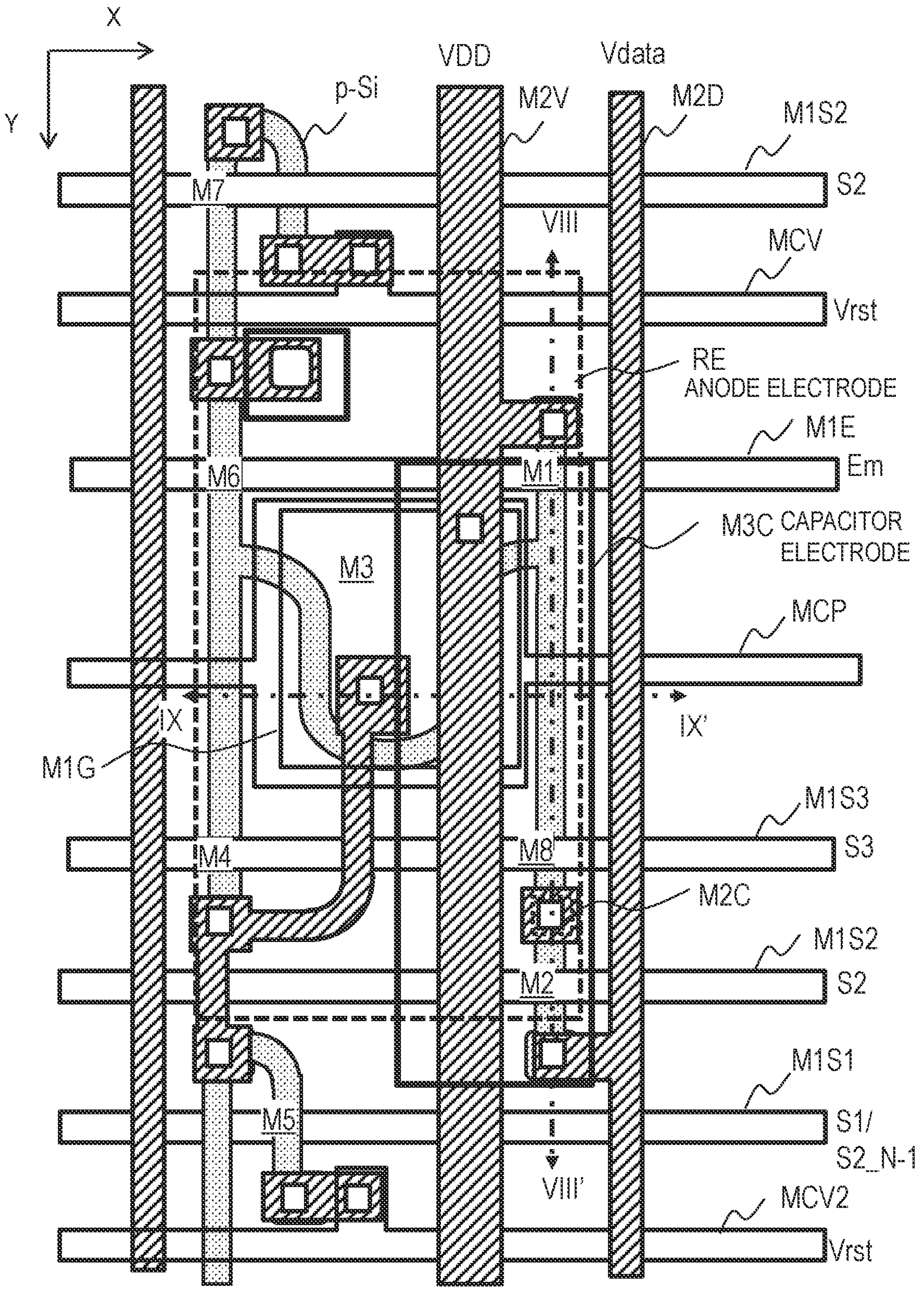
FIG. 7 schematically illustrates an example of the structure of a pixel circuit when viewed in the layering direction.

Hereinafter, an example of the device structure of a pixel circuit is described. FIG. 7 is a plan diagram schematically illustrating an example of the device structure of a pixel circuit when viewed in the layering direction. FIG. 7 illustrates a polysilicon layer and conductive layers in the pixel circuit. White squares represent contact regions of different conductive layers. A contact region is a conductive region provided inside a via hole passing through an insulating layer in the layering direction.

Transmission lines M1S1, M1S2, M1S3, and M1E transmit the selection signals S1, S2, and S3 and the emission control signal Em, respectively. These are included in a first metal layer. The first metal layer is a conductive layer. These transmission lines in the example of FIG. 7 extend in the X-axis direction. The selection signal S1 in the example of FIG. 7 is in common with the selection signal S2 for the previous row.

As described with reference to FIG. 2, the pixel circuit includes transistors M1 to M8. The channels of the transistors are included in a polysilicon layer p-Si. In FIG. 7, the polysilicon layer p-Si are represented by the same pattern. The gate electrodes of the transistors M1 to M8 are included in the first metal layer. In FIG. 7, the gate electrode of the driving transistor M3 is denoted by a reference sign M1G.

A conductive region MCP covers the whole gate electrode M1G of the driving transistor M3. The conductive region MCP is connected to a power line M2V for transmitting the anode power-supply potential VDD through a contact hole. The conductive region MCP is included in an intermediate conductive layer upper than the first metal layer. A part of the conductive region MCP is included in the storage capacitor Cst. The intermediate conductive layer further includes transmission lines MCV and MCV2 extending in the X-axis direction to transmit the reset potential Vrst. Transmission lines M2V and M2D extend in the Y-axis direction and transmit the anode power-supply potential VDD and the data signal Vdata, respectively. These are included in a second metal layer upper than the intermediate conductive layer. The second metal layer is a conductive layer.

A capacitor electrode M3C is included in a third metal layer upper than the second metal layer. The third metal layer is a conductive layer. The capacitor electrode M3C is connected to the source or the drain of the transistor M2 and the source or the drain of the transistor M8 through a contact region M2C of the second metal layer. The capacitor electrode M3C is a common electrode of the auxiliary capacitors Cd1 and Cd2 in the pixel circuit illustrated in FIG. 2.

The capacitor electrode M3C covers at least a part of the power line M2V for transmitting the anode power-supply potential VDD. The auxiliary capacitor Cd1 is configured between the capacitor electrode M3C and the power line M2V. Further, the anode electrode RE of the OLED element covers at least a part of the capacitor electrode M3C. The anode electrode RE is located upper than the third metal layer including the capacitor electrode M3C. The auxiliary capacitor Cd2 is configured between the capacitor electrode M3C and the anode electrode RE.

Figure 8:
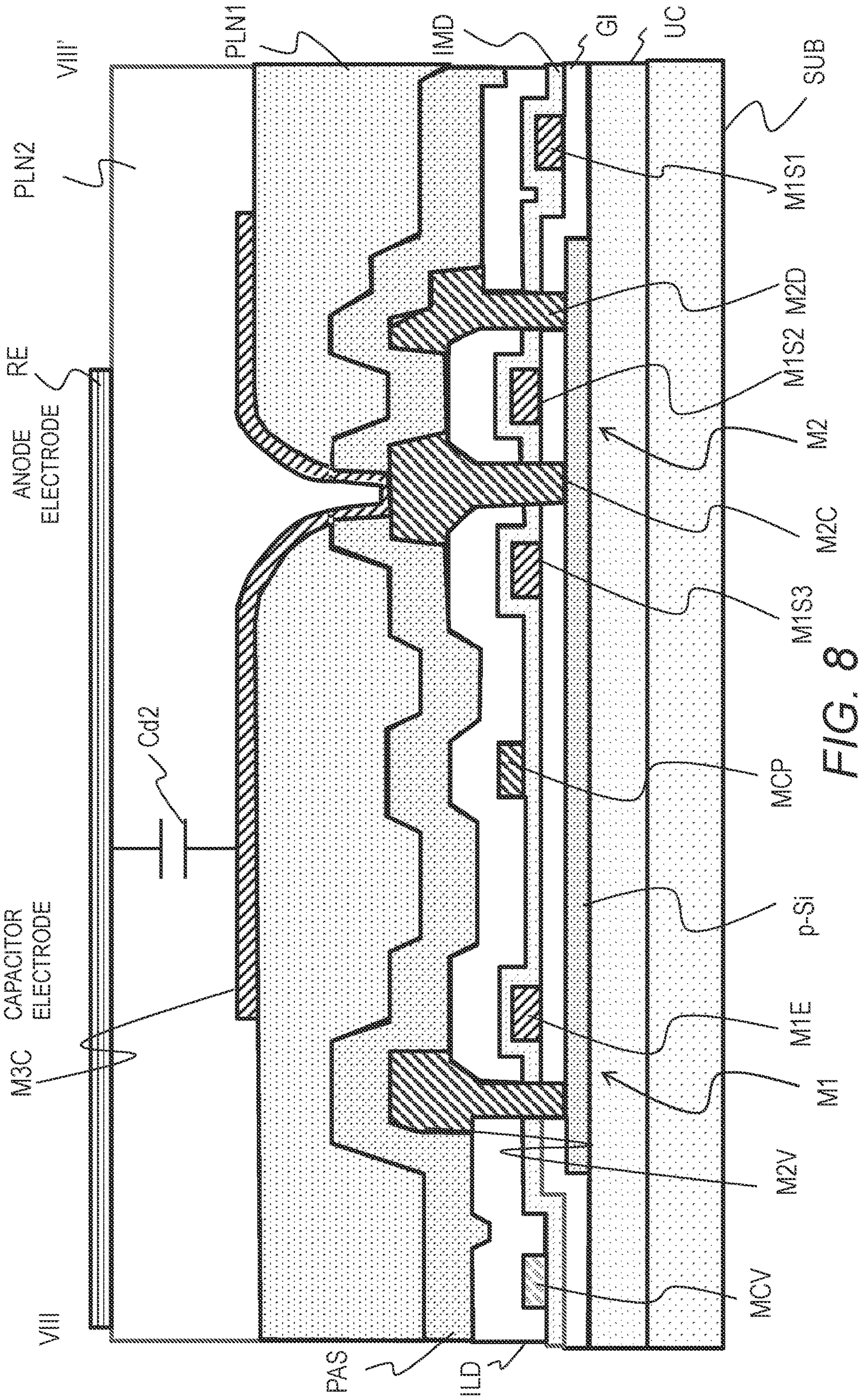
FIG. 8 schematically illustrates the cross-sectional structure along the section line VIII-VIII' in FIG. 7.

FIG. 8 schematically illustrates the cross-sectional structure along the section line VIII-VIII' in FIG. 7. FIG. 8 mainly illustrates the transistors M1 and M2 and the auxiliary capacitor Cd2. The layered structure of the pixel circuit is fabricated on a substrate SUB made of polyimide or glass. An undercoat layer UC of silicon nitride, for example, is laid above the substrate SUB. The polysilicon layer p-Si is laid above the undercoat layer UC. Further, a gate insulating layer GI is laid to cover the polysilicon layer p-Si. The gate insulating layer GI can be made of silicon oxide or silicon nitride.

The first metal layer is laid above the gate insulating layer GI. Specifically, the transmission line M1E for transmitting the emission control signal Em, the transmission lines M1S1, M1S2, and M1S3 for transmitting the selection signals S1, S2, and S3, respectively, are shown in FIG. 8. In FIG. 8, the transmission line M1S2 corresponds to the gate electrode of the transistor M2. The first metal layer can be made of a metal having a high melting point, such as W, Mo, or Ta or an alloy of such a metal.

An interlayer insulating layer IMD is laid to cover the first metal layer. The interlayer insulating layer IMD can be made of silicon oxide or silicon nitride. The intermediate conductive layer is laid above the interlayer insulating layer IMD. Specifically, the transmission line MCV for transmitting the reset potential and the conductive region MCP to be a part of the storage capacitor Cst are shown in FIG. 8. The intermediate conductive layer can have a single layer structure of a metal having a high melting point, such as W, Mo, or Ta, an alloy of such a metal, or Al, or a multilayered structure of Ti/Al/Ti.

An interlayer insulating layer ILD is laid to cover the intermediate conductive layer. The interlayer insulating layer ILD can be made of silicon oxide or silicon nitride. The second metal layer is provided above the interlayer insulating layer ILD. FIG. 8 shows the transmission line M2V for the anode power-supply potential VDD, the transmission line M2D for the data signal Vdata, and further, the contact region M2C. The transmission lines M2V and M2D and the contact region M2C are in contact with the polysilicon layer P—Si through via holes opened through the interlayer insulating layer ILD and the gate insulating layer GI.

A passivation layer PAS and a planarization layer PLN1 above the passivation layer PAS are provided to cover the layers lower than them. These layers can be made of organic or inorganic insulator. The third metal layer including the capacitor electrode M3C is provided above the planarization layer PLN1. The capacitor electrode M3C is in contact with the contact region M2C through a via hole opened through the planarization layer PLN1 and the passivation layer PAS.

Another planarization layer PLN2 is provided to cover the layers lower than it. The planarization layer PLN2 can be made of organic or inorganic insulator. The anode electrode RE of an OLED element is provided above the planarization layer PLN2. The anode electrode RE can have an ITO/Ag/ITO structure or an IZO/Ag/IZO structure.

A part of the anode electrode RE is opposed to the capacitor electrode M3C across the planarization layer PLN2 to configure the auxiliary capacitor Cd2. The auxiliary capacitor Cd2 configured between the anode electrode RE and the capacitor electrode M3C of the third metal layer effectively increases the capacitance for storing the auxiliary voltage for the Vth compensation at the storage capacitor Cst.

Figure 9:
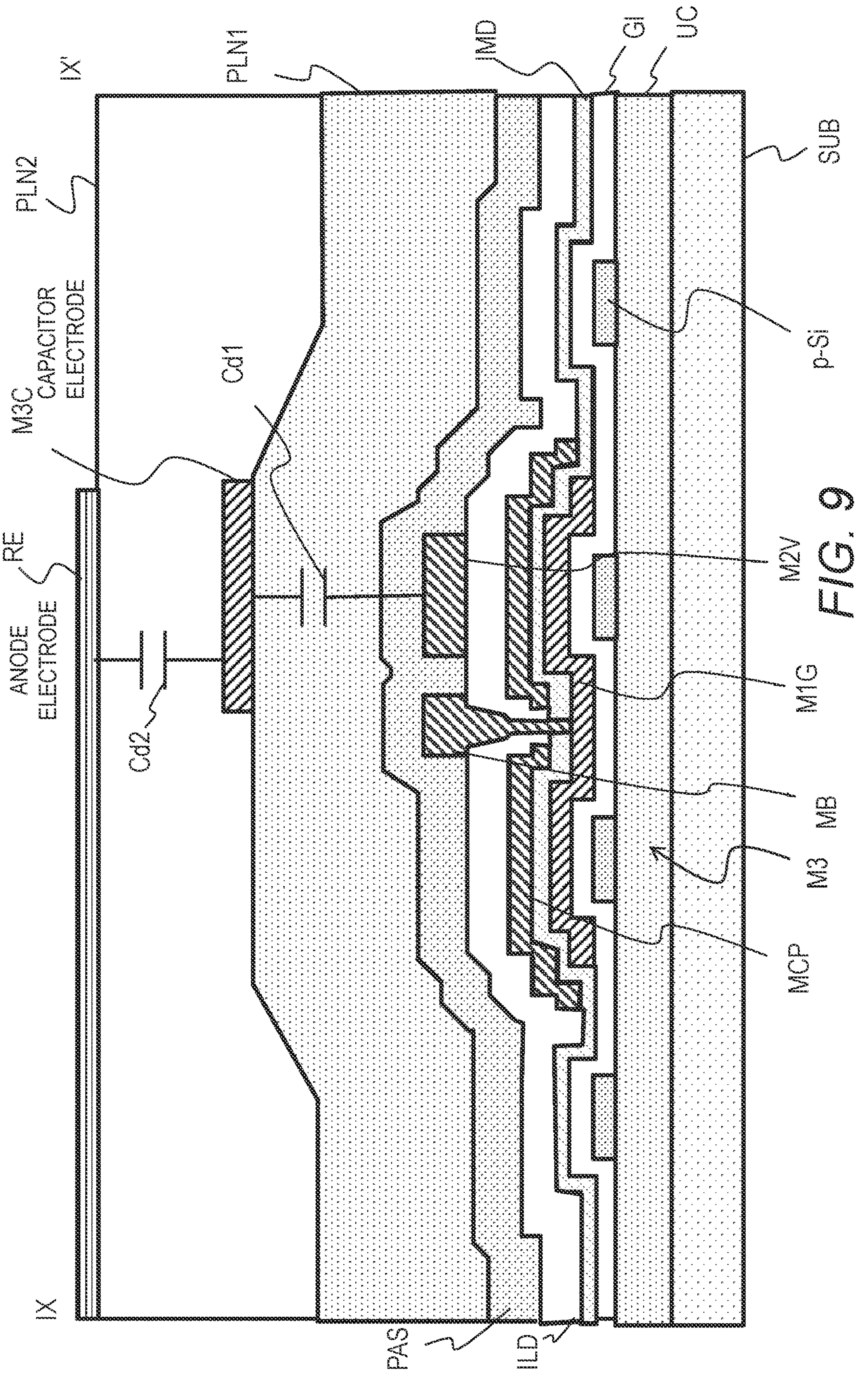
FIG. 9 schematically illustrates the cross-sectional structure along the section line IX-IX' in FIG. 7.

FIG. 9 schematically illustrates the cross-sectional structure along the section line IX-IX' in FIG. 7. FIG. 9 illustrates the cross-sectional structure of the driving transistor M3 and therearound. The gate electrode M1G of the driving transistor M3 covers the channel of the polysilicon layer p-Si with the gate insulating layer GI interposed therebetween to control the electric current that flows through the channel.

The conductive region MCP of the intermediate conductive layer is opposed to the gate electrode M1G across the interlayer insulating layer IMD. Further, the conductive region MCP is opposed to the transmission line M2V for the anode power-supply potential VDD across the interlayer insulating layer ILD. The storage capacitor Cst is configured between the gate electrode M1G and the transmission line M2V opposed to each other across the conductive region MCP.

A contact region MB of the second metal layer is provided through the interlayer insulating layer ILD, an opening of the conductive region MCP, and the interlayer insulating layer IMD to be in contact with the gate electrode M1G. The contact region MB connects the gate electrode M1G of the driving transistor M3 and a source/drain of the transistor M4.

The transmission line M2V for the anode power-supply potential VDD of the second metal layer is opposed to the capacitor electrode M3C of the third metal layer across the passivation layer PAS and the planarization layer PLN1. The auxiliary capacitor Cd1 is configured between the transmission line M2V and the capacitor electrode M3C. As also illustrated in FIG. 8, the auxiliary capacitor Cd2 is configured between the anode electrode RE and the capacitor electrode M3C.

As described above, providing an auxiliary capacitor between the anode power line and a capacitor electrode and another auxiliary capacitor between the capacitor electrode and the anode electrode attains an auxiliary capacitance required to apply appropriate Vth compensation to the control voltage of the driving transistor within a small area.

Other Configuration Examples

Figure 10:
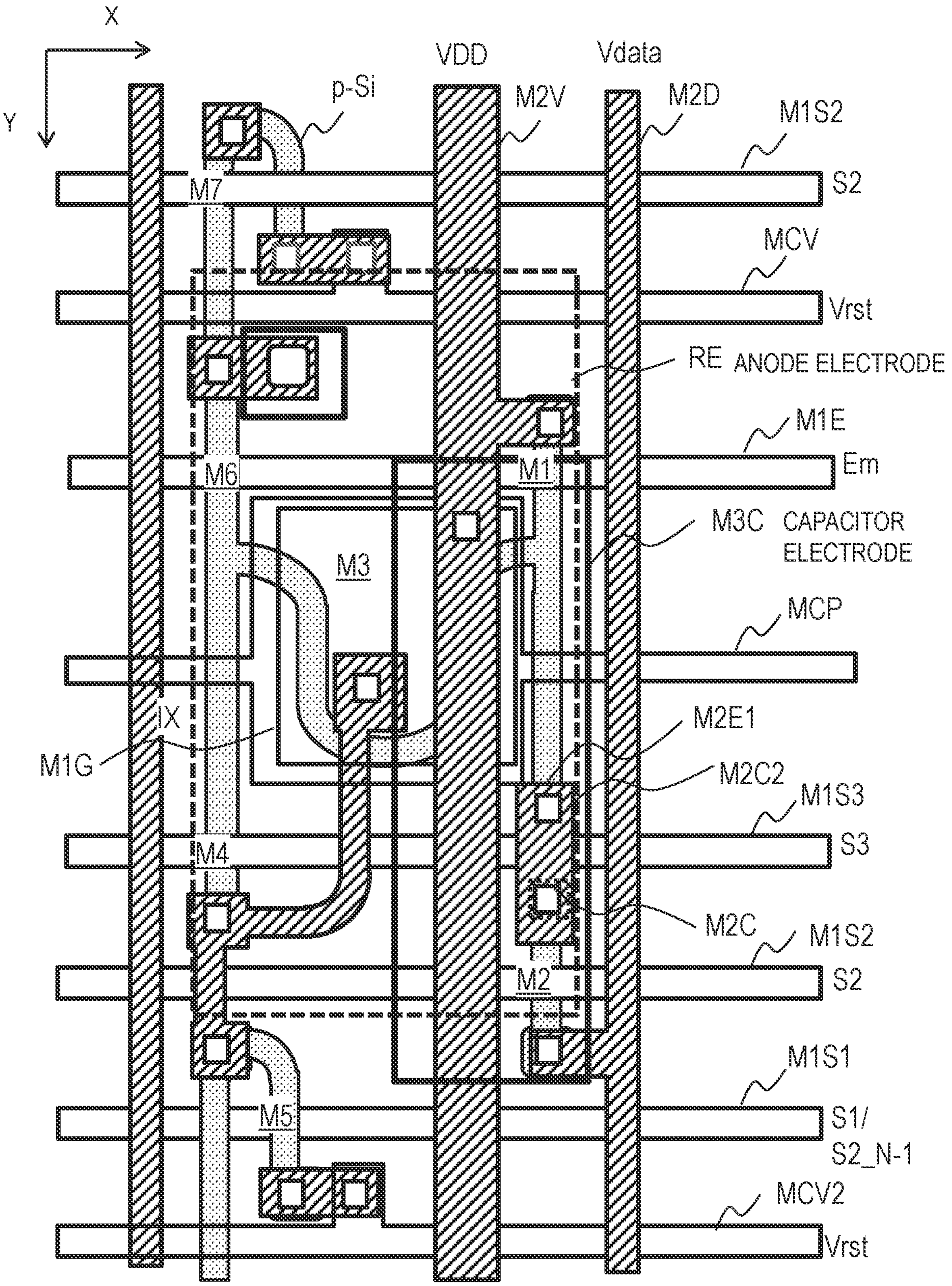
FIG. 10 is a plan diagram schematically illustrating a structural example of a pixel circuit in which one transistor is excluded.

Hereinafter, some different configuration examples of a pixel circuit are described. The transistor M8 can be excluded from the pixel circuit 400 illustrated in FIG. 2. FIG. 10 is a plan diagram schematically illustrating the structural example of the pixel circuit after excluding the transistor M8. The following mainly describes differences from the structure illustrated in FIG. 7.

As illustrated in FIG. 10, the pixel circuit includes an electrode region M2E1 of the second metal layer crossing over the transmission line M1S3. The electrode region M2E1 is connected to a source/drain of the transistor M2 through the contact region M2C and further, with a source/drain of the transistor M1 and the source of the transistor M3 through another contact region M2C2. This configuration excludes the transistor M8. Compared to this structure of FIG. 10, the structure of FIG. 7 can exclude the electrode region M2E1 crossing over the transmission line M1S3. The transistor M8 increases the number of circuit elements but makes the device structure simpler.

Figure 11:
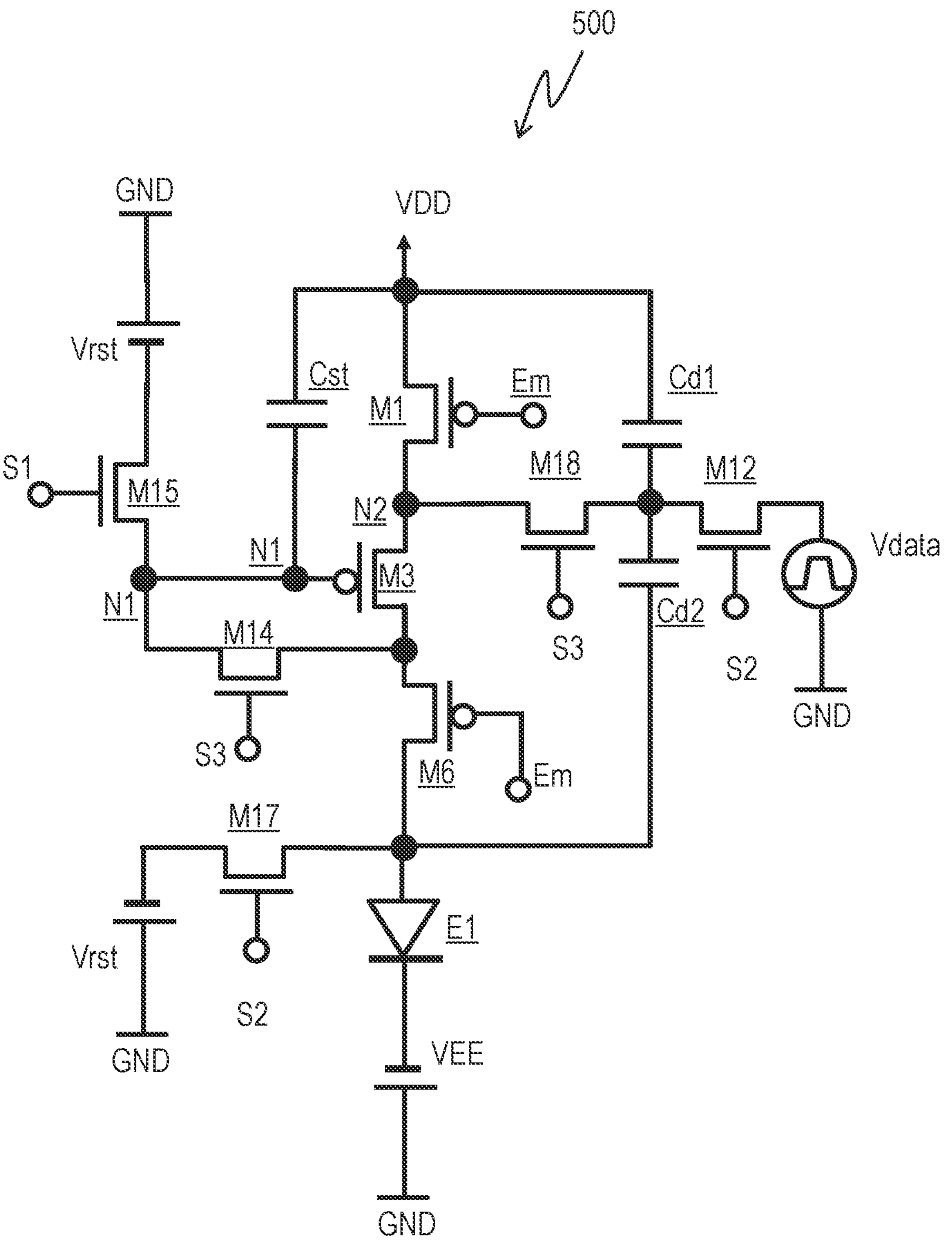
FIG. 11 illustrates another example of the circuit configuration of a pixel circuit.

FIG. 11 illustrates another example of the circuit configuration of a pixel circuit. Differences from the pixel circuit 400 in FIG. 2 are mainly described. The pixel circuit 500 includes n-type transistors M12, M14, M15, M17, and M18. These correspond to the p-type transistors M2, M4, M5, M7, and M8 in the pixel circuit 400 in FIG. 2. The transistors M1, M3, and M6 to transmit the driving current for the OLED element E1 are p-type polysilicon transistors having high mobility.

The selection signals S1, S2, and S3 for controlling the pixel circuit 500 exhibit variation opposite to the temporal variation illustrated in FIG. 3. In other words, the High level and the Low level in FIG. 3 replace each other. The emission control signal Em exhibits the same variation as the one in FIG. 3. The n-type transistors can be oxide semiconductor transistors. An oxide semiconductor transistor presents low leakage current, compared to a polysilicon transistor. Reducing the leakage current of the transistor M12 reduces the loss of the stored charges of the auxiliary capacitors Cd1 and Cd2. Reducing the leakage current of the transistors M14 and M15 reduces the loss of the stored charges of the storage capacitor Cst. One or more of the n-type transistors in FIG. 11 can be p-type transistors.

Figure 12:
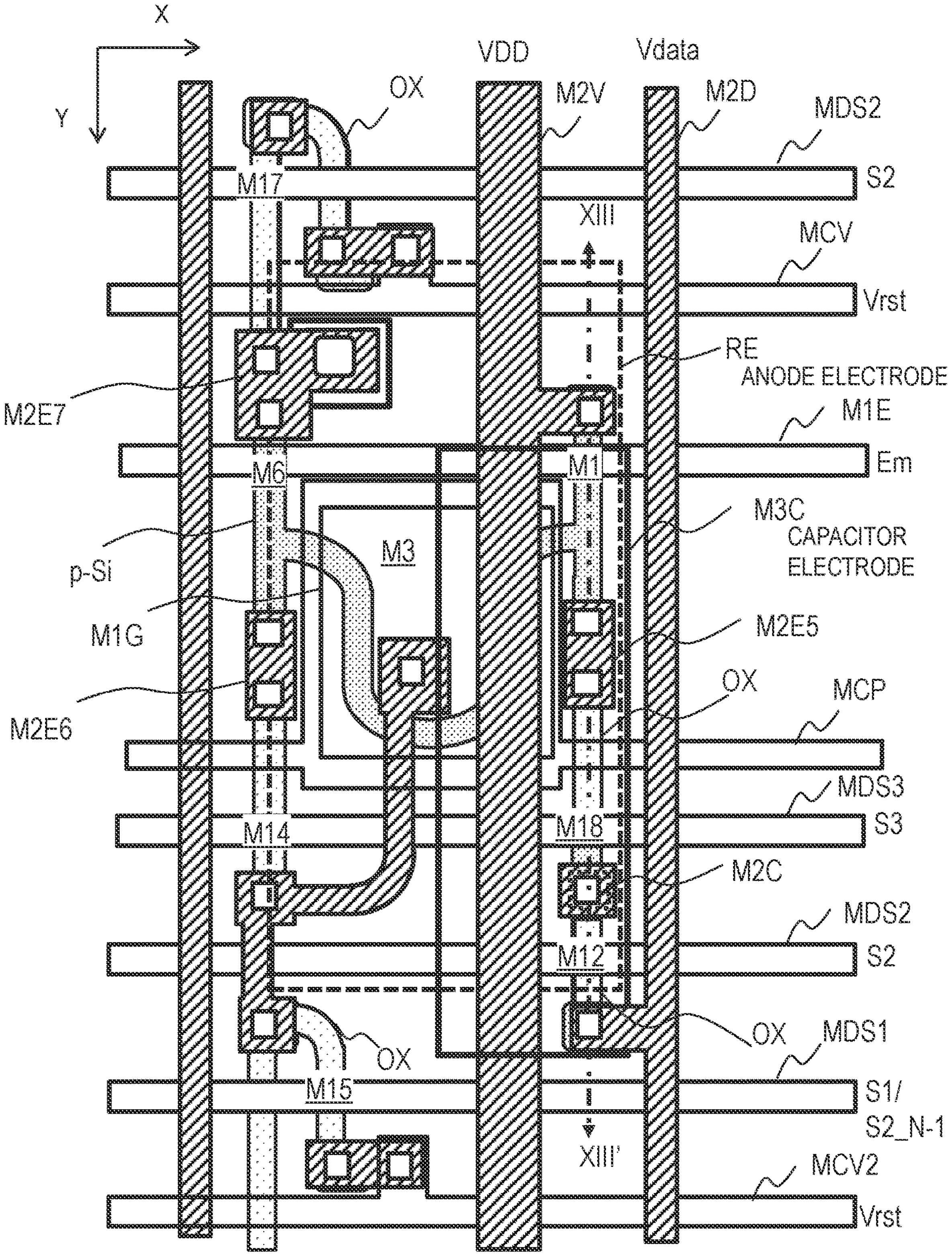
FIG. 12 is a plan diagram schematically illustrating an example of the device structure of the pixel circuit illustrated in FIG. 11.

FIG. 12 is a plan diagram schematically illustrating an example of the device structure of the pixel circuit 500 illustrated in FIG. 11. Differences from the structural example in FIG. 7 are mainly described. As described above, the p-transistors M2, M4, M5, M7, and M8 in the structural example in FIG. 7 are replaced with n-type transistors M12, M14, M15, M17, and M18, respectively. The p-type transistors are polysilicon TFT and the n-type transistors are oxide semiconductor TFTs. The oxide semiconductor can be InGaZnO or ZnO.

In FIG. 12, the oxide semiconductor layer OX includes the channels of the transistors M12, M14, M15, M17, and M18. The electrodes M2E5, M2E6, and M2E7 of the second metal layer interconnect a source/drain of a transistor of one conductive type and a source/drain of a transistor of the other conductive type. Specifically, the electrode M2E5 connects the p-type transistor M1 with the n-type transistor M18. The electrode M2E6 connects the p-type transistors M3 and M6 with the n-type transistor M18. The electrode M2E6 connects p-type transistors M3 and M6 with the n-type transistor M14. The electrode M2E7 connects the p-type transistor M6 with the n-type transistor M17.

Transmission lines MDS1, MDS2, and MDS3 for transmitting the selection signals S1, S2, and S3 are included in a fourth metal layer. The fourth metal layer is a conductive layer. As will be described later, the fourth metal layer is located between the intermediate metal layer and the second metal layer.

Figure 13:
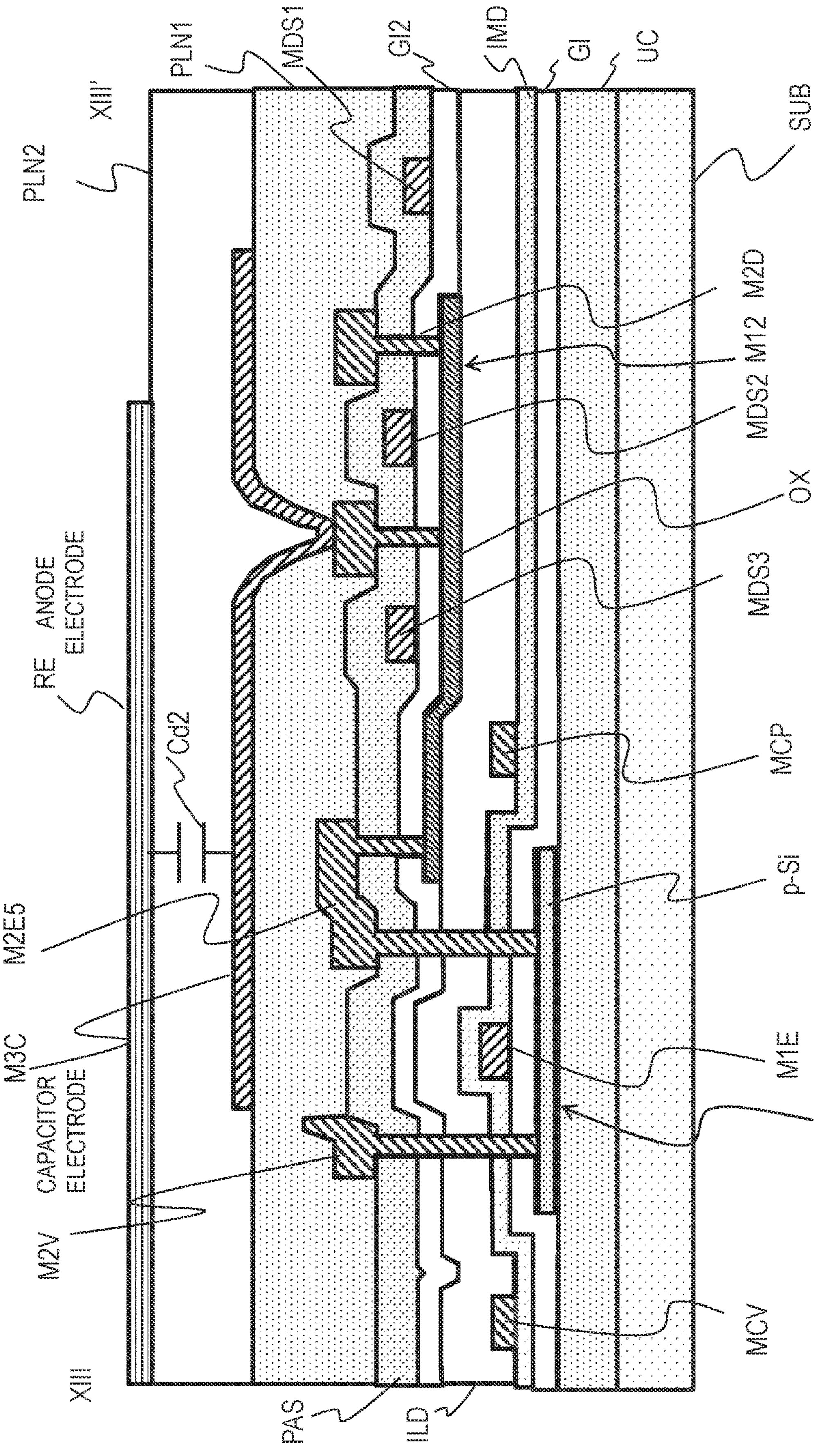
FIG. 13 schematically illustrates the cross-sectional structure along the section line XIII-XIII' in FIG. 12.

FIG. 13 schematically illustrates the cross-sectional structure along the section line XIII-XIII' in FIG. 12. Differences from the structural example in FIG. 8 are mainly described. The oxide semiconductor layer OX and a gate insulating layer G12 are laid between the interlayer insulating layer ILD and the passivation layer PAS. The oxide semiconductor layer OX is provided above the interlayer insulating layer ILD and covered with the gate insulating layer G12.

The electrode M2E5 of the second metal layer interconnects a source/drain of the polysilicon transistor M1 and a source/drain of the oxide semiconductor transistor M12. Specifically, the electrode M2E5 of the second metal layer is in contact with a source/drain of the p-type transistor M1 through a via hole opened through the passivation layer PAS, the gate insulating layer G12, the interlayer insulating layer ILD, the interlayer insulating layer IMD, and the gate insulating layer GI. Moreover, the electrode M2E5 of the second metal layer is in contact with a source/drain of the n-type transistor M12 through a via hole opened through the passivation layer PAS and the gate insulating layer G12.

The transmission lines MDS1, MDS2, and MDS3 for transmitting the selection signals S1, S2, and S3 are included in the fourth metal layer. The fourth metal layer can be made of a metal having a high melting point, such as W, Mo, or Ta or an alloy of such a metal. The fourth metal layer is provided between the gate insulating layer G12 and the passivation layer PAS. The fourth metal layer is a metal layer (conductive layer) between the intermediate conductive layer and the second metal layer.

Figure 14:
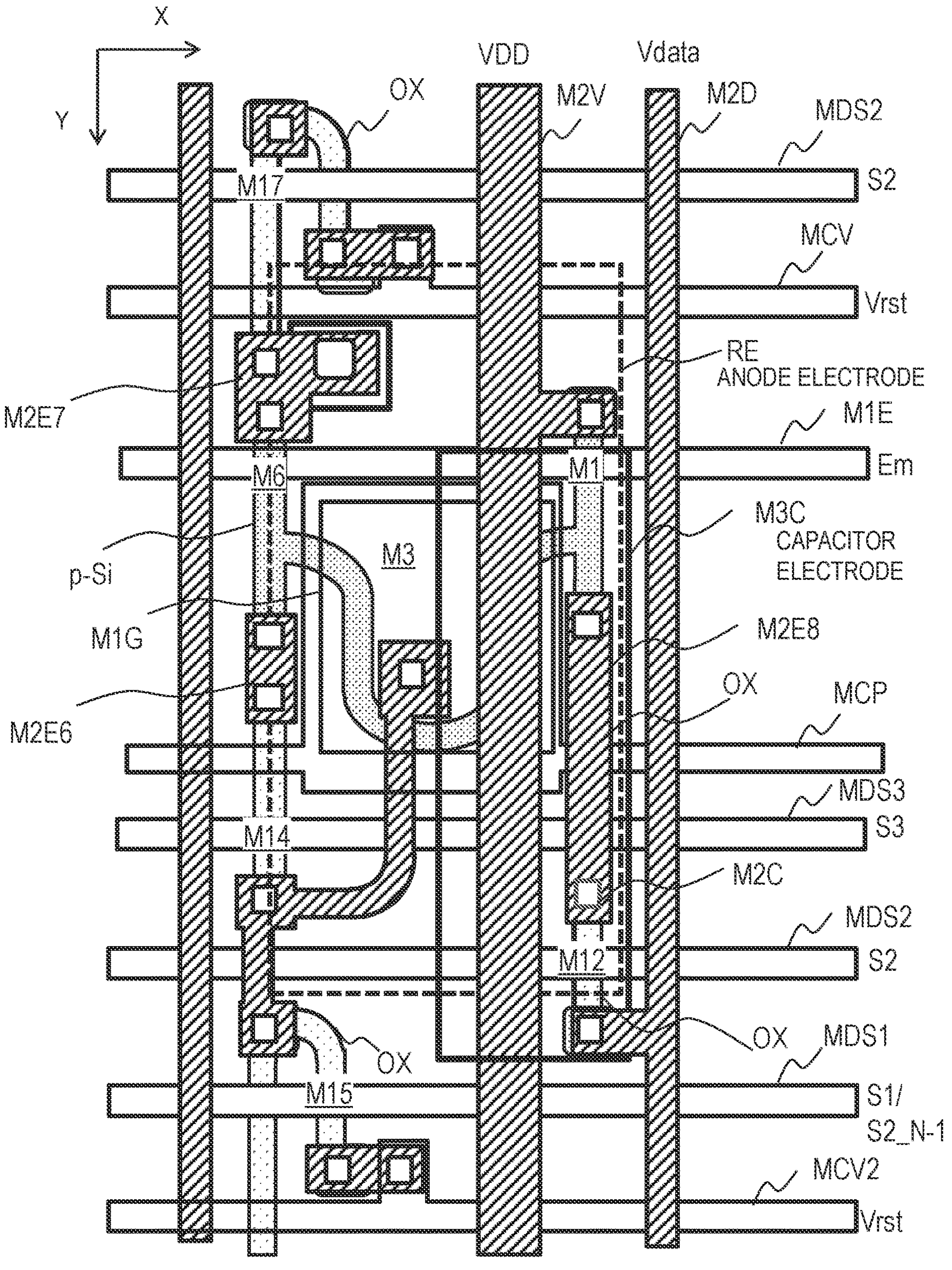
FIG. 14 is a plan diagram schematically illustrating an example of the device structure of a pixel circuit in which one transistor is excluded from the pixel circuit illustrated in FIG. 11.

Like the transistor M8 in the pixel circuit 400 in FIG. 2, the transistor M18 can be excluded from the pixel circuit 500 in FIG. 11. FIG. 14 is a plan diagram schematically illustrating an example of the device structure of a circuit 500 in which the transistor M18 is excluded. In place of the electrode M2E5 in the structural example in FIG. 12, an electrode M2E8 is used.

The electrode M2E8 is included in the second metal layer. It crosses over the conductive region MCP and the transmission line MDS3 and interconnects a source/drain of the p-type transistor M1 and a source/drain of the n-type transistor M12. Including the transistor M18 in the pixel circuit 500 makes the device structure simpler.

Figure 15:
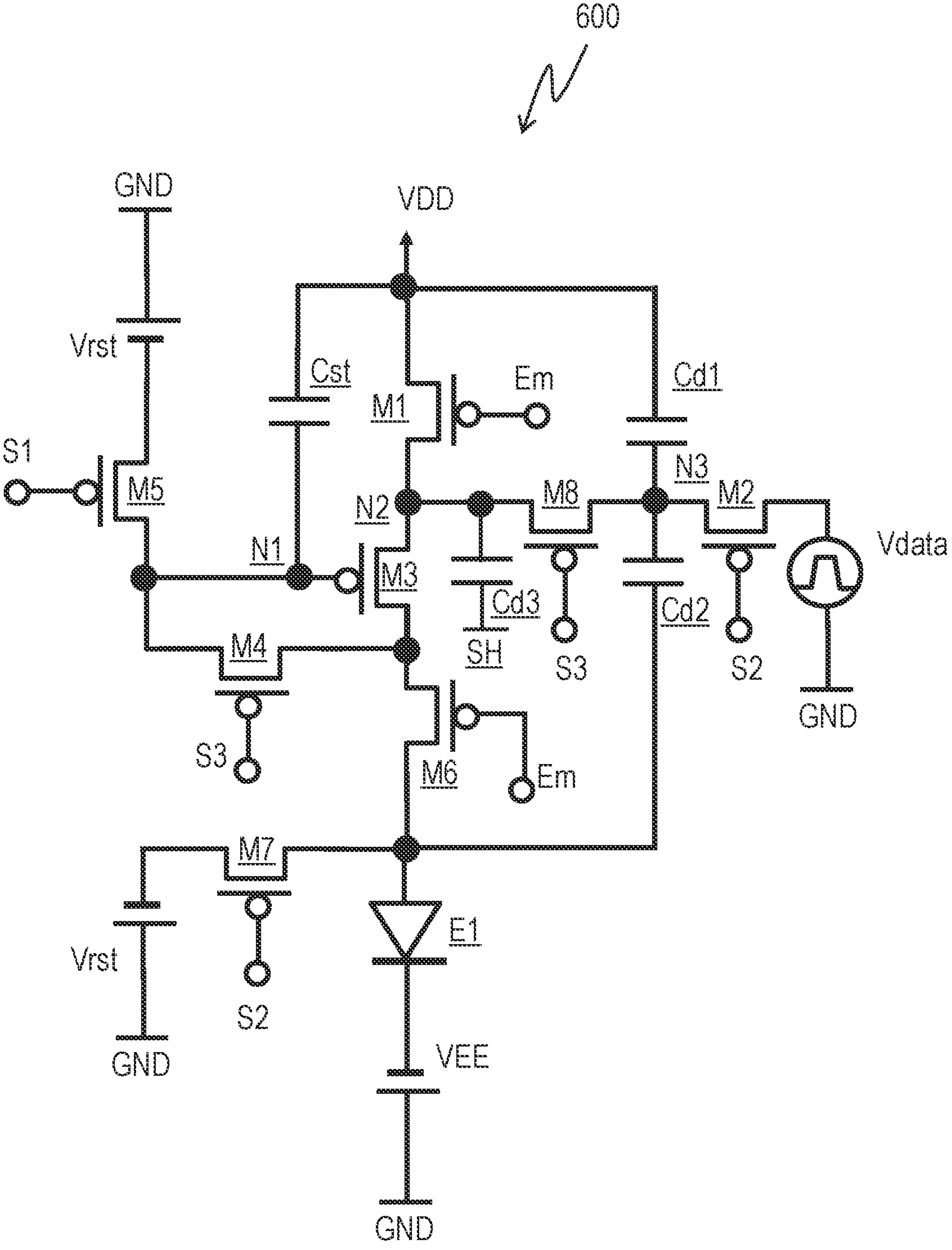
FIG. 15 illustrates still another example of the circuit configuration of a pixel circuit.

FIG. 15 illustrates still another example of the circuit configuration of a pixel circuit. Differences from the pixel circuit 400 in FIG. 2 are mainly described. The pixel circuit 600 includes a third auxiliary capacitor Cd3 and a second capacitor electrode SH, in addition to the configuration of the pixel circuit 400 in FIG. 2. One end of the third auxiliary capacitor Cd3 is the second capacitor electrode SH and the other end is connected to the node N2. The second capacitor electrode SH can be supplied with a fixed potential. The remaining configuration is the same as the configuration of the pixel circuit 400.

Figure 16:
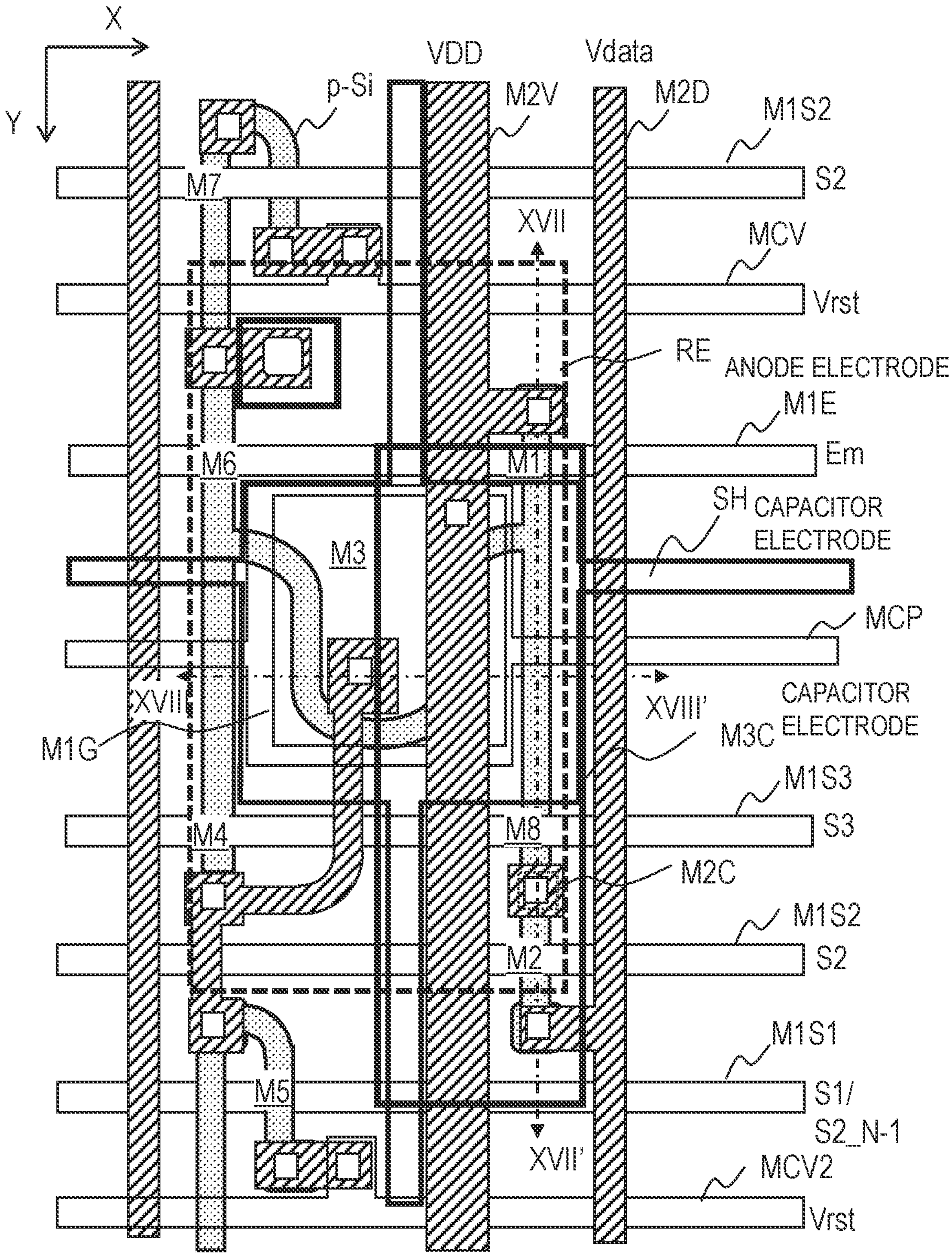
FIG. 16 is a plan diagram schematically illustrating an example of the device structure of the pixel circuit illustrated in FIG. 15.
Figure 17:
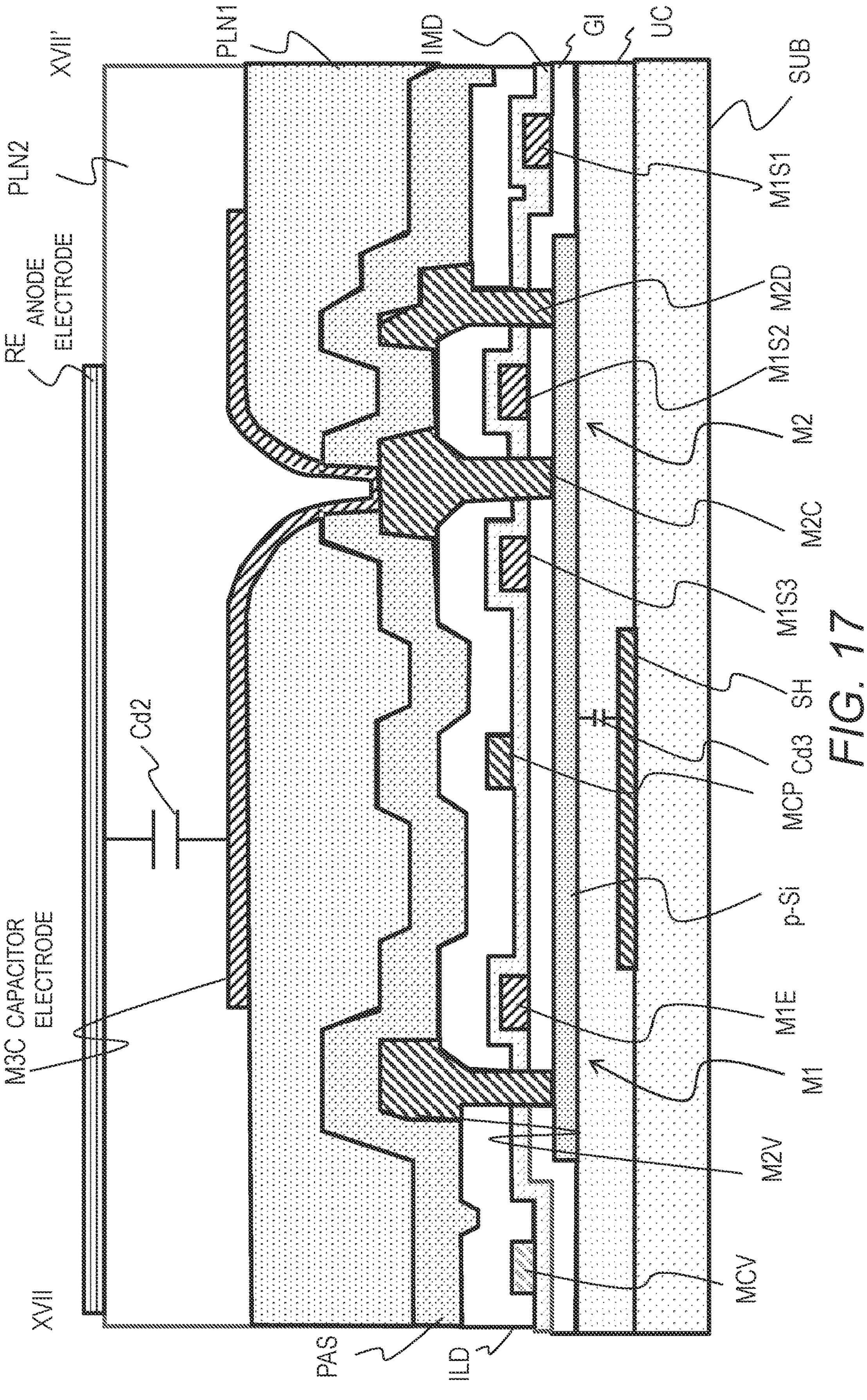
FIG. 17 schematically illustrates the cross-sectional structure along the section line XVII-XVII' in FIG. 16.
Figure 18:
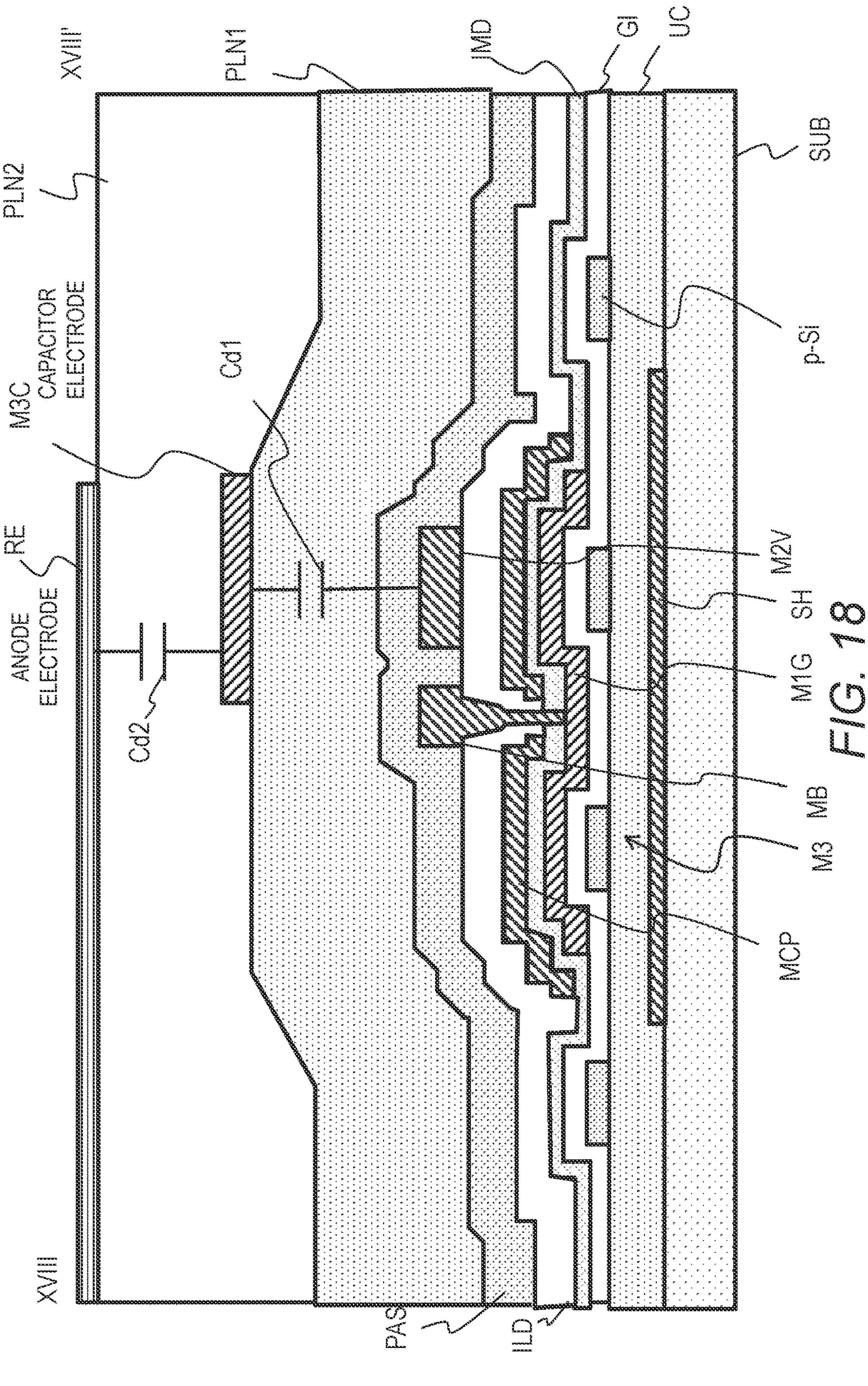
FIG. 18 schematically illustrates the cross-sectional structure along the section line XVIII-XVIII' in FIG. 16.

FIG. 16 is a plan diagram schematically illustrating an example of the device structure of the pixel circuit illustrated in FIG. 15. FIG. 17 schematically illustrates the cross-sectional structure along the section line XVII-XVII' in FIG. 16. FIG. 18 schematically illustrates the cross-sectional structure along the section line XVIII-XVIII' in FIG. 16. The following mainly describes differences from the structural example described with reference to FIGS. 7 to 9.

The structural example illustrated in FIGS. 16 to 18 includes a second capacitor electrode SH between the substrate SUB and the undercoat layer UC. As illustrated in FIG. 16, the second capacitor electrode SH is disposed under the driving transistor M3 and at least partially overlaps the driving transistor M3.

The second capacitor electrode SH can be supplied with a fixed potential, for example, the ground potential. The third auxiliary capacitor Cd3 is configured with the polysilicon layer p-Si including the drain of the driving transistor M3 and the second capacitor electrode SH. Although the structural example illustrated in FIGS. 16 to 18 includes the capacitor electrode M3C, the capacitor electrode M3C is optional.

Since the total capacitance of the auxiliary capacitors can be made large, ghosts can be controlled effectively even if the pixel size is reduced to raise the resolution. Further, in the case where a polyimide film is employed as the substrate, undesirable current drift in the driving transistor caused by fixed charge generated in the polyimide can be blocked by the layer of the second capacitor electrode to stabilize the driving transistor. As a result, brightness drifting that occurs shortly after the startup of the panel and ghosts, especially those caused by a long-time stress, are reduced.

Figure 19:
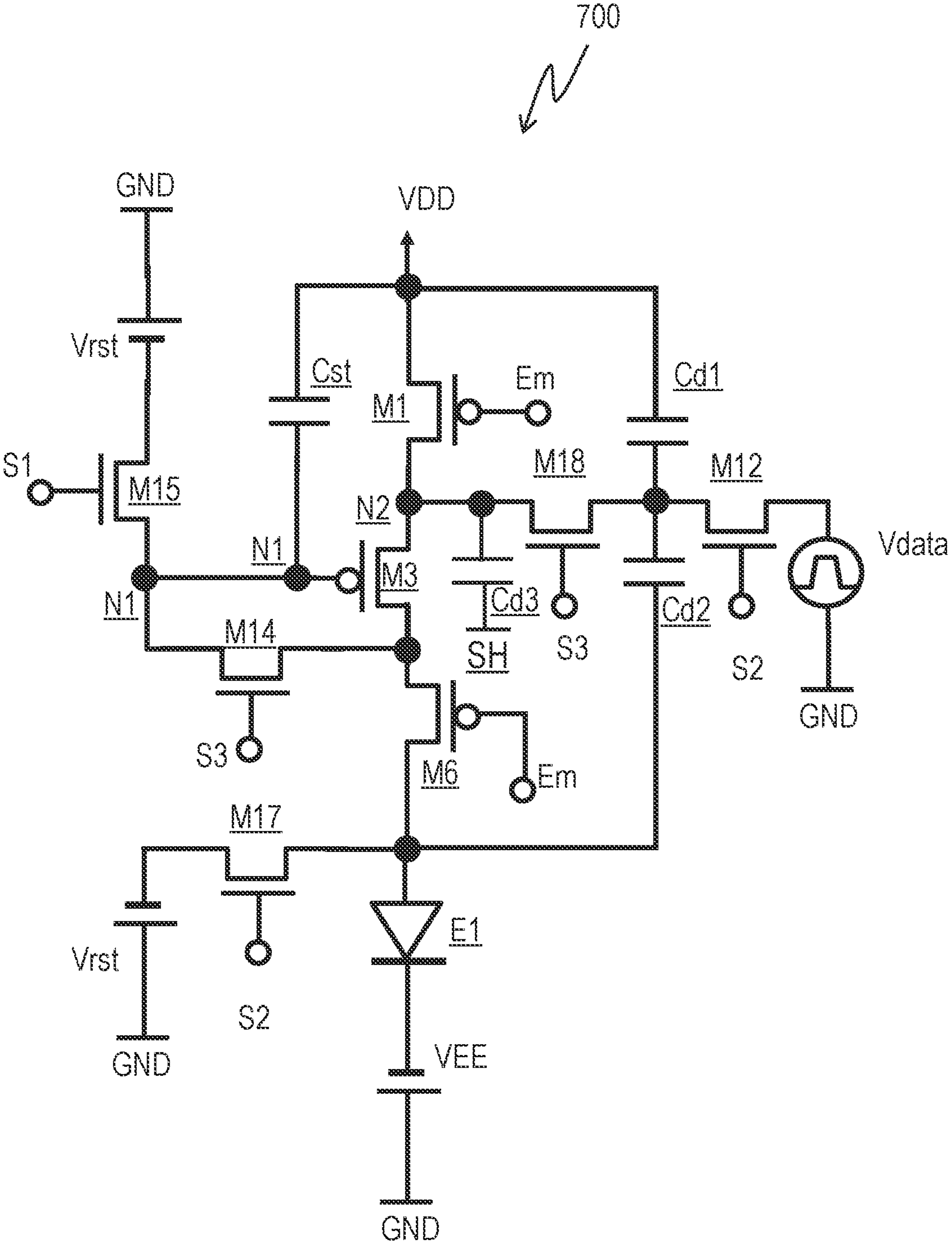
FIG. 19 illustrates still another example of the circuit configuration of a pixel circuit.

FIG. 19 illustrates still another example of the circuit configuration of a pixel circuit. Differences from the pixel circuit 500 in FIG. 11 are mainly described. The pixel circuit 700 includes a third auxiliary capacitor Cd3 and a second capacitor electrode SH. One end of the third auxiliary capacitor Cd3 is the second capacitor electrode SH and the other end is connected to the node N2. The second capacitor electrode SH can be supplied with a fixed potential. The remaining configuration is the same as the configuration of the pixel circuit 500.

Figure 20:
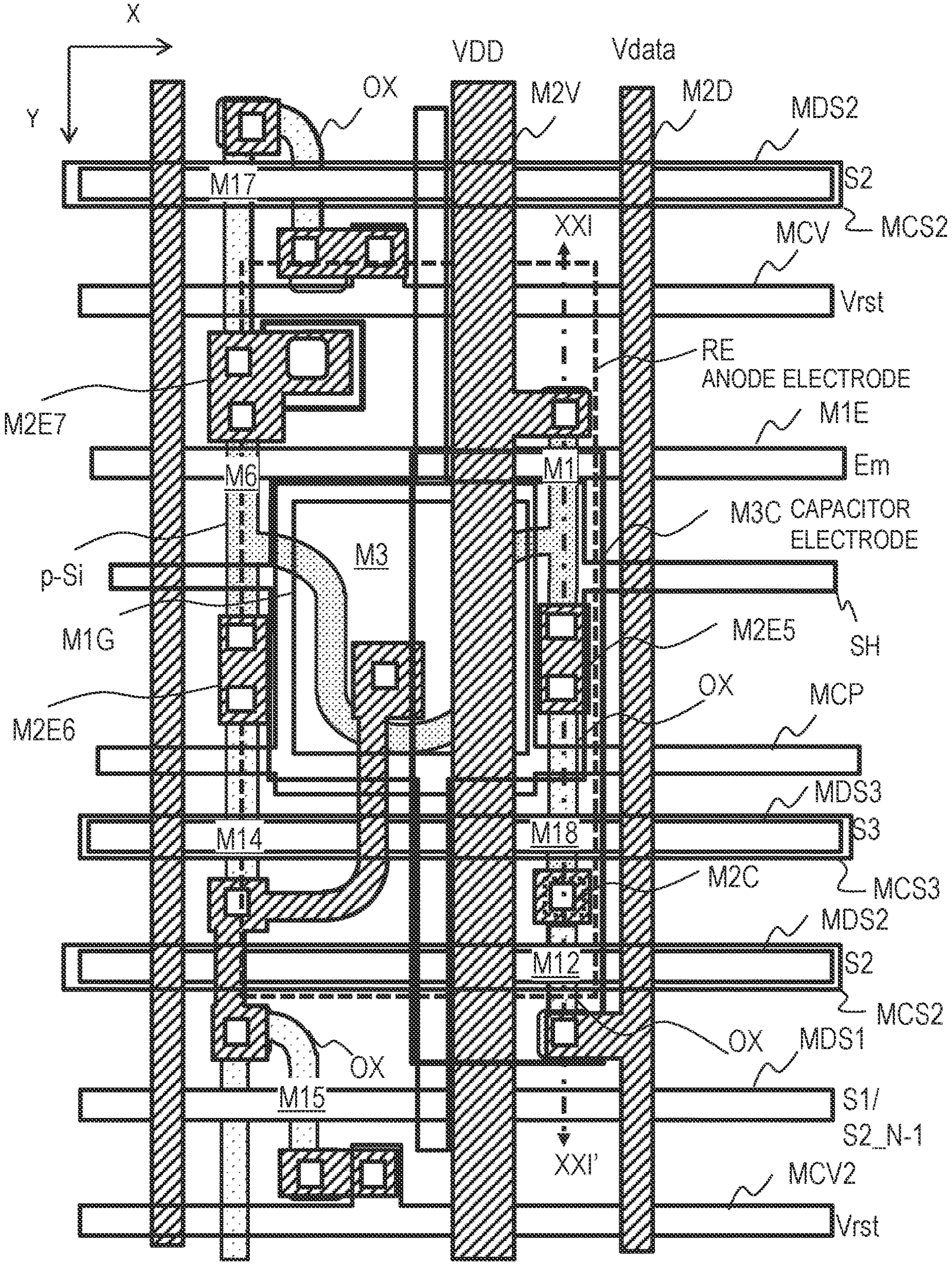
FIG. 20 is a plan diagram schematically illustrating an example of the device structure of the pixel circuit illustrated in FIG. 19.
Figure 21:
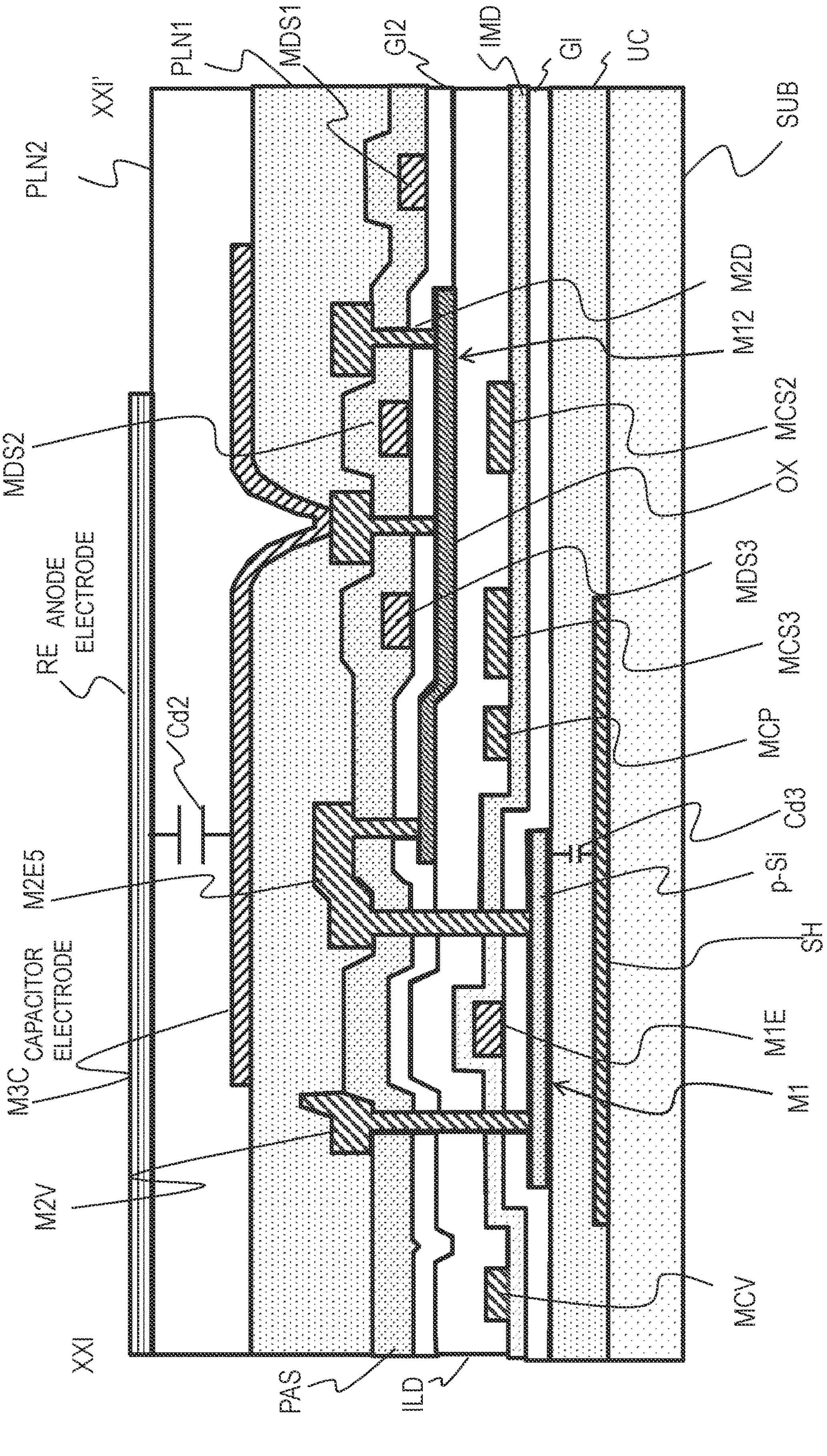
FIG. 21 schematically illustrates the cross-sectional structure along the section line XXI-XXI' in FIG. 20.

FIG. 20 is a plan diagram schematically illustrating an example of the device structure of the pixel circuit in FIG. 19. FIG. 21 schematically illustrates the cross-sectional structure along the section line XXI-XXI' in FIG. 20. The following mainly describes differences from the structural example described with reference to FIGS. 12 and 13.

The structural example illustrated in FIGS. 20 and 21 includes a second capacitor electrode SH between the substrate SUB and the undercoat layer UC. As illustrated in FIG. 20, the second capacitor electrode SH is disposed under the driving transistor M3 and at least partially overlaps the driving transistor M3.

The second capacitor electrode SH can be supplied with a fixed potential, for example, the ground potential. The third auxiliary capacitor Cd3 is configured with the polysilicon layer p-Si including the drain of the driving transistor M3 and the second capacitor electrode SH. Although the structural example illustrated in FIGS. 20 and 21 includes the capacitor electrode M3C, the capacitor electrode M3C is optional.

Furthermore, bottom-gate lines MCS2 and MCS3 are added to make the oxide semiconductor transistors M12, M17, and M18 dual gate TFTs. The bottom-gate lines MCS2 and MCS3 are disposed between the interlayer insulating layers IMD and ILD. In the structural example in FIGS. 20 and 21, the top-gate line MDS2 overlaps the bottom-gate line MCS2 and the top-gate line MDS3 overlaps the bottom-gate line MCS3 when viewed planarly. The top-gate line MDS2 is connected to the bottom-gate line MCS2 and the top-gate line MDS3 is connected to the bottom-gate line MCS3, for example in the outside of the display region, so that the top gates and the bottom gates are driven at the same potential.

In the case where a polyimide film is employed as the substrate, undesirable Vth drift of the oxide semiconductor transistors caused by fixed charge generated in the polyimide can be blocked by the bottom-gate lines to stabilize the characteristics of the transistors. The oxide semiconductor transistors having a dual-gate structure can reduce the short-channel effect. Hence, the oxide semiconductor transistors can have a shorter channel, which increases the driving ability to enable a high-resolution pixel layout.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A pixel circuit configured to control light emission of a light-emitting diode, the pixel circuit comprising:

the light-emitting diode;

a driving transistor configured to control driving current to the light-emitting diode;

a storage capacitor directly connected to a gate of the driving transistor and being configured to store control voltage for the driving transistor;

a first switching transistor configured to connect or disconnect between the gate and a drain of the driving transistor;

a second switching transistor directly connected to a data line;

a third switching transistor electrically connecting the second switching transistor and a source of the driving transistor, the second switching transistor and the third switching transistor being configured to transfer a data signal voltage from the data line to the storage capacitor through the driving transistor and the first switching transistor;

a fourth switching transistor electrically connecting a reset power supply and an anode electrode of the light-emitting diode, and an auxiliary capacitor directly connected to the second switching transistor and the third switching transistor, the auxiliary capacitor being configured to store auxiliary charges that depend on the data signal voltage from the data line, wherein the auxiliary capacitor retains the auxiliary charges in accordance with the data signal voltage from the data line during a first period in a frame period where the second switching transistor, the third switching transistor and the first switching transistor are ON, wherein the auxiliary charges are transferred from the auxiliary capacitor to the storage capacitor through the third switching transistor, the first switching transistor and the driving transistor during a second period following the first period in the frame period where the second switching transistor is OFF and the first switching transistor and the third switching transistor are ON, wherein the auxiliary capacitor is a first auxiliary capacitor, wherein the pixel circuit further includes a second auxiliary capacitor, wherein the first auxiliary capacitor is connected between a power supply line provided to supply an anode current for the light-emitting diode and a node between the second switching transistor and the driving transistor, wherein the second auxiliary capacitor is connected between the node between the second switching transistor and the driving transistor and the anode electrode of the light-emitting diode, and wherein the fourth switching transistor is ON during the first period.

2. The pixel circuit according to claim 1, wherein a capacitance of the auxiliary capacitor is equal to or more than a capacitance of the storage capacitor.

3. The pixel circuit according to claim 1, wherein the third switching transistor is controlled by a same control signal as a control signal for the first switching transistor.

4. The pixel circuit according to claim 3, wherein the driving transistor is a p-type polysilicon semiconductor transistor, and wherein the first switching transistor, the second switching transistor, and the third switching transistor are n-type metal oxide semiconductor transistors.

5. The pixel circuit according to claim 1, further comprising:

an electrode layer located between a semiconductor layer of the driving transistor and a substrate, wherein the auxiliary capacitor is connected between a power supply line provided to supply an anode current for the light-emitting diode and a node between the second switching transistor and the driving transistor, and wherein a third auxiliary capacitor is configured between the semiconductor layer of the driving transistor and the electrode layer.

6. The pixel circuit according to claim 4, wherein the first switching transistor, the second switching transistor, and the third switching transistor have a dual-gate structure where a semiconductor layer is sandwiched by a first gate electrode and a second gate electrode.

7. The pixel circuit according to claim 1, wherein capacitance of the auxiliary capacitor is equal to or larger than ½ of capacitance of the storage capacitor.

8. The pixel circuit according to claim 1, wherein a sum of the first period and the second period is not less than five times and not more than ten times of the first period.

9. The pixel circuit according to claim 1, wherein a product of a capacitance ratio of the auxiliary capacitor to the storage capacitor and a cube of a ratio of a sum of the first period and the second period to the first period is not less than 100 and not more than 700.

* * * * *